(12) United States Patent
Liu et al.

(10) Patent No.: US 11,678,394 B2
(45) Date of Patent: Jun. 13, 2023

(54) TECHNIQUES FOR MULTICAST BEAM FAILURE AND RECOVERY

(71) Applicant: QUALCOMM incorporated, San Diego, CA (US)

(72) Inventors: Le Liu, Fremont, CA (US); Alberto Rico Alvarino, San Diego, CA (US); Peter Gaal, San Diego, CA (US); Wanshi Chen, San Diego, CA (US); Tao Luo, San Diego, CA (US); Xiaoxia Zhang, San Diego, CA (US); Ayan Sengupta, San Diego, CA (US); Kazuki Takeda, Tokyo (JP); Prasad Reddy Kadiri, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 64 days.

(21) Appl. No.: 17/352,866

(22) Filed: Jun. 21, 2021

(65) Prior Publication Data
US 2021/0410220 A1 Dec. 30, 2021

Related U.S. Application Data

(60) Provisional application No. 63/043,696, filed on Jun. 24, 2020.

(51) Int. Cl.
| | | |
|---|---|---|
| *H04W 76/19* | (2018.01) | |
| *H04L 12/18* | (2006.01) | |
| *H04W 4/06* | (2009.01) | |
| *H04W 72/1268* | (2023.01) | |
| *H04W 74/08* | (2009.01) | |
| *H04W 72/23* | (2023.01) | |

(52) U.S. Cl.
CPC ............ *H04W 76/19* (2018.02); *H04W 4/06* (2013.01); *H04W 72/1268* (2013.01); *H04W 72/23* (2023.01); *H04W 74/0833* (2013.01); *H04L 12/189* (2013.01)

(58) Field of Classification Search
CPC . H04W 4/06; H04W 72/046; H04W 72/1268; H04W 72/14; H04W 74/0833; H04W 76/19; H04W 76/40; H04L 12/1868; H04L 12/189
See application file for complete search history.

(56) References Cited

FOREIGN PATENT DOCUMENTS

| WO | 2021218960 | * 11/2021 |
|---|---|---|
| WO | 2002107816 | * 5/2022 |

* cited by examiner

*Primary Examiner* — Gary Mui
(74) *Attorney, Agent, or Firm* — Holland & Hart LLP

(57) ABSTRACT

Methods, systems, and devices for wireless communications are described. A user equipment (UE) may transmit, to the base station, a beam recovery request including an indication of a multicast beam, where the beam recovery request is transmitted based at least in part on a unicast uplink grant, and where the unicast uplink grant comprises a set of uplink resources for a multicast beam recovery procedure based at least in part on a failure of the multicast beam associated with multicast communications between the UE and the base station. The UE may receive, from the base station in response to the beam recovery request, a response message including an indication of a second uplink grant, an indication of a second beam for communications between the UE and the base station, or both. The UE may transmit a first uplink transmission via the second uplink grant, the second beam, or both.

30 Claims, 15 Drawing Sheets

TECHNIQUES FOR MULTICAST BEAM FAILURE AND RECOVERY

CROSS REFERENCE

The present application for patent claims the benefit of U.S. Provisional Patent Application No. 63/043,696 by Liu et al., entitled "TECHNIQUES FOR MULTICAST BEAM FAILURE AND RECOVERY," filed Jun. 24, 2020, assigned to the assignee hereof, and expressly incorporated by reference herein.

FIELD OF TECHNOLOGY

The following relates generally to wireless communications and more specifically to techniques for multicast beam failure and recovery.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for multicast beam failure and recovery. Generally, the described techniques provide for determining multicast beam failure and performing multicast beam recovery. In some aspects, techniques for multicast beam recovery may leverage signaling used for unicast beam recovery in order to perform multicast beam recovery. For example, a user equipment (UE) may identify a failure of a multicast beam by measuring parameters associated with the multicast beam and comparing the parameters to respective parameter thresholds. Upon identifying the failure of the multicast beam, the UE may identify a unicast uplink grant associated with a multicast beam recovery procedure. In some aspects, the UE may receive the unicast uplink grant in response to transmitting a link recovery request to a base station. Subsequently, the UE may transmit a beam recovery request (e.g., beam failure recovery (BFR) request) to the base station, where the beam recovery request indicates that the multicast beam has failed. The UE may receive a response message acknowledging the beam recovery request and indicating an uplink grant for retransmitting downlink transmissions using the multicast beam and/or a new beam for communications between the UE and the base station. The new beam may include a new unicast beam and/or a new multicast beam. Subsequently, the UE may communicate with the base station using the new beam indicated in the response message. By leveraging signaling used for recovery of unicast beams, techniques described herein may enable improved multicast beam recovery and may reduce control signaling overhead associated with multicast beam recovery.

A method of wireless communication at a UE is described. The method may include transmitting, to a base station, a beam recovery request comprising an indication of a multicast beam, wherein the beam recovery request is transmitted based at least in part on a unicast uplink grant, and wherein the unicast uplink grant comprises a set of uplink resources for a multicast beam recovery procedure based at least in part on a failure of the multicast beam associated with multicast communications between the UE and the base station. The method may further include receiving, from the base station in response to the beam recovery request, a response message including an indication of a second uplink grant, an indication of a second beam for communications between the UE and the base station, or both. The method may also include transmitting, to the base station, a first uplink transmission via the second uplink grant, the second beam, or both.

An apparatus for wireless communication at a UE is described. The apparatus may include a processor, memory coupled with the processor, and instructions stored in the memory. The instructions may be executable by the processor to cause the apparatus to transmit, to a base station, a beam recovery request comprising an indication of a multicast beam, wherein the beam recovery request is transmitted based at least in part on a unicast uplink grant, and wherein the unicast uplink grant comprises a set of uplink resources for a multicast beam recovery procedure based at least in part on a failure of the multicast beam associated with multicast communications between the UE and the base station. The instructions may be further executable by the processor to cause the apparatus to receive, from the base station in response to the beam recovery request, a response message including an indication of a second uplink grant, an indication of a second beam for communications between the UE and the base station, or both. The instructions may be further executable by the processor to cause the apparatus to transmit, to the base station, a first uplink transmission via the second uplink grant, the second beam, or both.

Another apparatus for wireless communication at a UE is described. The apparatus may include means for transmitting, to a base station, a beam recovery request comprising an indication of a multicast beam, wherein the beam recovery request is transmitted based at least in part on a unicast uplink grant, and wherein the unicast uplink grant comprises a set of uplink resources for a multicast beam recovery procedure based at least in part on a failure of the multicast beam associated with multicast communications between the UE and the base station. The apparatus may also include means for receiving, from the base station in response to the beam recovery request, a response message including an indication of a second uplink grant, an indication of a second beam for communications between the UE and the base station, or both, and transmitting, to the base station, a first uplink transmission via the second uplink grant, the second beam, or both.

A non-transitory computer-readable medium storing code for wireless communication at a UE is described. The code may include instructions executable by a processor to transmit, to a base station, a beam recovery request comprising an indication of a multicast beam, wherein the beam recovery request is transmitted based at least in part on a unicast uplink grant, wherein the unicast uplink grant comprises a set of uplink resources for a multicast beam recovery procedure based at least in part on a failure of the multicast beam associated with multicast communications between the UE and the base station, receive, from the base station in response to the beam recovery request, a response message including an indication of a second uplink grant, an indication of a second beam for communications between the UE and the base station, or both, and transmit, to the base station, a first uplink transmission via the second uplink grant, the second beam, or both.

Some examples of the method, apparatuses, and non-transitory computer-readable medium described herein may further include operations, features, means, or instructions for transmitting, to the base station, a link recovery request including an indication of the multicast beam recovery procedure based on the failure of the multicast beam, and receiving, from the base station in response to the link recovery request, an indication of the unicast uplink grant.

Some examples of the method, apparatuses, and non-transitory computer-readable medium described herein may further include operations, features, means, or instructions for receiving, from the base station via a unicast beam, a control message indicating the unicast uplink grant including the set of uplink resources for the multicast beam recovery procedure, where determining the unicast uplink grant may be based on receiving the control message.

Some examples of the method, apparatuses, and non-transitory computer-readable medium described herein may further include operations, features, means, or instructions for determining a failure of a unicast beam associated with unicast communications between the UE and the base station, and determining a priority between the multicast beam recovery procedure and a unicast beam recovery procedure associated with the unicast beam based on the failure of the unicast beam, where transmitting the beam recovery request may be based on determining the priority.

Some examples of the method, apparatuses, and non-transitory computer-readable medium described herein may further include operations, features, means, or instructions for determining the unicast beam recovery procedure may have a higher priority than the multicast beam recovery procedure, and performing the unicast beam recovery procedure based on determining the unicast beam recovery procedure may have higher priority than the multicast beam recovery procedure, where the beam recovery request may be transmitted based on performing the unicast beam recovery procedure.

Some examples of the method, apparatuses, and non-transitory computer-readable medium described herein may further include operations, features, means, or instructions for transmitting the beam recovery request via a physical random access channel based at least in part on the multicast beam recovery procedure having a higher priority than the unicast beam recovery procedure.

Some examples of the method, apparatuses, and non-transitory computer-readable medium described herein may further include operations, features, means, or instructions for transmitting, to the base station via the link recovery request, a scheduling request for transmitting the beam recovery request, where the indication of the unicast uplink grant may be received in response to the scheduling request.

Some examples of the method, apparatuses, and non-transitory computer-readable medium described herein may further include operations, features, means, or instructions for transmitting, to the base station via the beam recovery request, an indication of one or more candidate beams for communications between the UE and the base station.

In some examples of the method, apparatuses, and non-transitory computer-readable medium described herein, the response message may include operations, features, means, or instructions for transmitting, to the base station, the first uplink transmission via the second uplink grant, and transmitting, to the base station, a second uplink transmission according to the one or more candidate beams based on determining an indication to transmit uplink transmissions according to the one or more candidate beams.

Some examples of the method, apparatuses, and non-transitory computer-readable medium described herein may further include operations, features, means, or instructions for determining an expiration of a timer based on receiving the response message and a timer duration, where determining the indication to transmit uplink transmissions according to the one or more candidate beams may be based on determining the expiration of the timer.

In some examples of the method, apparatuses, and non-transitory computer-readable medium described herein, the response message includes the indication of the second beam, where the first uplink transmission may be transmitted to the base station via the second beam.

Some examples of the method, apparatuses, and non-transitory computer-readable medium described herein may further include operations, features, means, or instructions for performing one or more measurements on downlink messages received from the base station via the multicast beam, determining one or more beam parameters associated with the multicast beam based on the one or more measurements, and comparing the one or more beam parameters to one or more beam parameter thresholds, where identifying the failure of the multicast beam may be based on the comparing.

In some examples of the method, apparatuses, and non-transitory computer-readable medium described herein, identifying the failure of the multicast beam may include operations, features, means, or instructions for determining, based on the comparing, that at least one beam parameter of the one or more beam parameters satisfies at least one beam parameter threshold of the one or more beam parameter thresholds.

In some examples of the method, apparatuses, and non-transitory computer-readable medium described herein, the one or more beam parameters include a reference signal received power value, a reference signal received quality value, a signal-to-noise ratio, a signal-to-interference-plus-noise ratio, or any combination thereof.

Some examples of the method, apparatuses, and non-transitory computer-readable medium described herein may further include operations, features, means, or instructions for transmitting, to the base station via the beam recovery request, an indication of the one or more beam parameters associated with the multicast beam, where the response message may be based on the indication of the one or more beam parameters associated with the multicast beam.

In some examples of the method, apparatuses, and non-transitory computer-readable medium described herein, the beam recovery request may be transmitted via a MAC-CE message, a radio resource control message, or both.

In some examples of the method, apparatuses, and non-transitory computer-readable medium described herein, the second beam includes a second multicast beam for communications between the UE and the base station.

In some examples of the method, apparatuses, and non-transitory computer-readable medium described herein, the second beam includes a unicast beam for communications between the UE and the base station.

In some examples of the method, apparatuses, and non-transitory computer-readable medium described herein, the response message may include operations, features, means, or instructions for receiving, from the base station, a retransmission of a first downlink transmission via the multicast beam based on the indication of the multicast beam, and receiving, from the base station, a second downlink transmission via the second beam based on the indication of the second beam.

A method of wireless communication at a base station is described. The method may include determining a unicast uplink grant including a set of uplink resources for a multicast beam recovery procedure associated with a multicast beam configured for multicast communications between a UE and the base station, receiving, from the UE, a beam recovery request including an indication of the multicast beam, where the beam recovery request is received based on the unicast uplink grant, transmitting, to the UE in response to the beam recovery request, a response message including an indication of a second uplink grant, an indication of a second beam for communications between the UE and the base station, or both, and receiving, from the UE, a first uplink transmission via the second uplink grant, the second beam, or both.

An apparatus for wireless communication at a base station is described. The apparatus may include a processor, memory coupled with the processor, and instructions stored in the memory. The instructions may be executable by the processor to cause the apparatus to determine a unicast uplink grant including a set of uplink resources for a multicast beam recovery procedure associated with a multicast beam configured for multicast communications between a UE and the base station, receive, from the UE, a beam recovery request including an indication of the multicast beam, where the beam recovery request is received based on the unicast uplink grant, transmit, to the UE in response to the beam recovery request, a response message including an indication of a second uplink grant, an indication of a second beam for communications between the UE and the base station, or both, and receive, from the UE, a first uplink transmission via the second uplink grant, the second beam, or both.

Another apparatus for wireless communication at a base station is described. The apparatus may include means for determining a unicast uplink grant including a set of uplink resources for a multicast beam recovery procedure associated with a multicast beam configured for multicast communications between a UE and the base station, receiving, from the UE, a beam recovery request including an indication of the multicast beam, where the beam recovery request is received based on the unicast uplink grant, transmitting, to the UE in response to the beam recovery request, a response message including an indication of a second uplink grant, an indication of a second beam for communications between the UE and the base station, or both, and receiving, from the UE, a first uplink transmission via the second uplink grant, the second beam, or both.

A non-transitory computer-readable medium storing code for wireless communication at a base station is described. The code may include instructions executable by a processor to determine a unicast uplink grant including a set of uplink resources for a multicast beam recovery procedure associated with a multicast beam configured for multicast communications between a UE and the base station, receive, from the UE, a beam recovery request including an indication of the multicast beam, where the beam recovery request is received based on the unicast uplink grant, transmit, to the UE in response to the beam recovery request, a response message including an indication of a second uplink grant, an indication of a second beam for communications between the UE and the base station, or both, and receive, from the UE, a first uplink transmission via the second uplink grant, the second beam, or both.

Some examples of the method, apparatuses, and non-transitory computer-readable medium described herein may further include operations, features, means, or instructions for receiving, from the UE, a link recovery request including an indication of the multicast beam recovery procedure based on a failure of the multicast beam, and transmitting, to the UE in response to the link recovery request, an indication of the unicast uplink grant.

Some examples of the method, apparatuses, and non-transitory computer-readable medium described herein may further include operations, features, means, or instructions for transmitting, to the UE via a unicast beam, a control message indicating the unicast uplink grant including the set of uplink resources for the multicast beam recovery procedure.

Some examples of the method, apparatuses, and non-transitory computer-readable medium described herein may further include operations, features, means, or instructions for receiving, from the UE via the link recovery request, a scheduling request for transmitting the beam recovery request, where the indication of the unicast uplink grant may be transmitted in response to the scheduling request.

Some examples of the method, apparatuses, and non-transitory computer-readable medium described herein may further include operations, features, means, or instructions for receiving, from the UE via the beam recovery request, an indication of one or more candidate beams for communications between the UE and the base station.

In some examples of the method, apparatuses, and non-transitory computer-readable medium described herein, the response message may include operations, features, means, or instructions for receiving, from the UE, the first uplink transmission via the second uplink grant, and receiving, from the UE, a second uplink transmission according to the one or more candidate beams based on determining an indication to receive uplink transmissions according to the one or more candidate beams.

Some examples of the method, apparatuses, and non-transitory computer-readable medium described herein may further include operations, features, means, or instructions for determining an expiration of a timer based on transmitting the response message and a timer duration, where determining the indication to receive uplink transmissions according to the one or more candidate beams may be based on determining the expiration of the timer.

In some examples of the method, apparatuses, and non-transitory computer-readable medium described herein, the response message includes the indication of the second uplink grant, where the first uplink transmission may be received from the UE via the second beam.

Some examples of the method, apparatuses, and non-transitory computer-readable medium described herein may further include operations, features, means, or instructions for receiving, from the UE via the beam recovery request, an indication of one or more beam parameters associated with the multicast beam, where the response message may be based on the indication of the one or more beam parameters associated with the multicast beam.

In some examples of the method, apparatuses, and non-transitory computer-readable medium described herein, the one or more beam parameters include a reference signal received power value, a reference signal received quality value, a signal-to-noise ratio, a signal-to-interference-plus-noise ratio, or any combination thereof.

In some examples of the method, apparatuses, and non-transitory computer-readable medium described herein, the beam recovery request may be received via a MAC-CE message, a radio resource control message, or both.

In some examples of the method, apparatuses, and non-transitory computer-readable medium described herein, the second beam includes a second multicast beam for communications between the UE and the base station.

In some examples of the method, apparatuses, and non-transitory computer-readable medium described herein, the second beam includes a unicast beam for communications between the UE and the base station.

In some examples of the method, apparatuses, and non-transitory computer-readable medium described herein, the response message may include operations, features, means, or instructions for transmitting, to the UE, a retransmission of a first downlink transmission via the multicast beam based on the indication of the multicast beam, and transmitting, to the UE, a second downlink transmission via the second beam based on the indication of the second beam.

DETAILED DESCRIPTION

In some wireless communications systems, various types of beams may be supported, including single-cell unicast beams, single-cell multicast beams, and multi-cell multicast beams. In cases where a user equipment (UE) identifies a failure of a unicast beam (e.g., single-cell unicast beam) between the UE and a base station, the UE may trigger a beam failure recovery procedure in order to recover a unicast beam. However, some wireless communications systems do not support beam recovery procedures for multicast beams.

To address issues associated with beam recovery in the context of multicast transmissions, techniques for determining multicast beam failure and performing multicast beam recovery are disclosed. In some aspects, techniques for multicast beam recovery may leverage signaling used for unicast beam recovery in order to perform multicast beam recovery. For example, a UE may identify a failure of a multicast beam by measuring parameters associated with the multicast beam (e.g., reference signal received power (RSRP) values, reference signal received quality (RSRQ) values, signal-to-noise ratio (SNR) values, signal-to-interference-plus noise ratio (SINR) values, etc.) and comparing the parameters to respective threshold values. Upon identifying the failure of the multicast beam, the UE may identify a unicast uplink grant associated with a multicast beam recovery procedure. In some aspects, the UE may receive the unicast uplink grant in response to transmitting a link recovery request to a base station. Subsequently, the UE may transmit a beam recovery request (e.g., beam failure recovery (BFR) request) to the base station, where the beam recovery request indicates the failed multicast beam. The UE may receive a response message acknowledging the beam recovery request. The response message may also indicate an uplink grant for retransmitting downlink transmissions using the multicast beam and/or a new beam for communications between the UE and the base station. The new beam may include a new unicast beam and/or a new multicast beam. Subsequently, the UE may communicate with the base station using the new beam indicated in the response message. By leveraging signaling used for recovery of unicast beams, techniques described herein may enable improved multicast beam recovery and may reduce control signaling overhead associated with multicast beam recovery.

Aspects of the disclosure are initially described in the context of wireless communications systems. Additional aspects of the disclose are described in the context of an example process flow. Aspects of the disclosure are further illustrated by and described with reference to apparatus diagrams, system diagrams, and flowcharts that relate to techniques for multicast beam failure and recovery.

Figure 1:
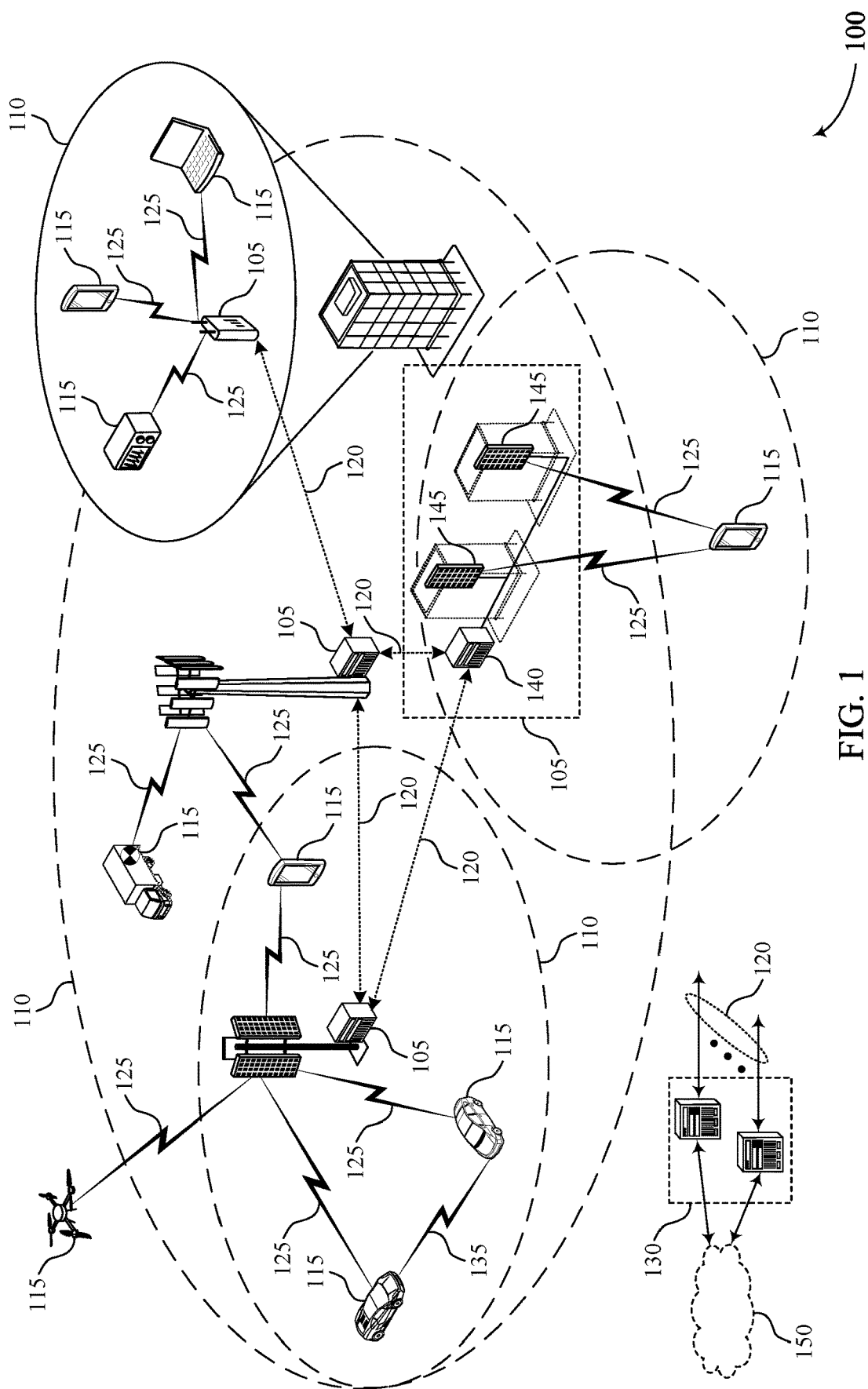
FIG. 1 illustrates an example of a wireless communications system that supports techniques for multicast beam failure and recovery in accordance with aspects of the present disclosure.

FIG. 1 illustrates an example of a wireless communications system 100 that supports techniques for multicast beam failure and recovery in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

he time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support communications for determining multicast beam failure and performing multicast beam recovery. In some aspects, techniques for multicast beam recovery may leverage signaling used for unicast beam recovery in order to perform multicast beam recovery. For example, a UE 115 of the wireless communications system 100 may identify a failure of a multicast beam by measuring parameters associated with the multicast beam (e.g., RSRP, RSRQ, SNR, SINR), and comparing the parameters to respective parameter thresholds. Upon identifying the failure of the multicast beam, the UE 115 may identify a unicast uplink grant associated with a multicast beam recovery procedure. In some aspects, the UE 115 may receive the unicast uplink grant in response to transmitting a link recovery request to a base station 105. Subsequently, the UE 115 may transmit a beam recovery request (e.g., BFR request) to the base station, where the beam recovery request indicates the failed multicast beam. In some cases, the UE 115 may identify one or more candidate beams (e.g., other multicast beams, unicast beams), and indicate the one or more candidate beams to the base station 105.

Continuing with the same example, the UE 115 may receive, from the base station 105, a response message acknowledging the beam recovery request, and indicating an uplink grant for retransmitting downlink transmissions using the multicast beam and/or a new beam for communications between the UE 115 and the base station 105. The new beam may include a new unicast beam and/or a new multicast beam. For instance, the new beam may include a candidate beam identified by the UE 115 and indicated to the base station 105 via the beam recovery request. In some aspects, the response message transmitted by the base station 105 may include an indication of two or more beams. For example, the response message may include an indication of the multicast beam and an indication of a second beam (e.g., unicast beam). In this example, the UE 115 may receive retransmissions of previously-sent downlink messages via the unicast beam, and may receive new downlink transmissions via the second beam (e.g., unicast beam). Subsequently, the UE 115 may communicate with the base station 105 using the new beam indicated in the response message.

The techniques described herein may provide for improved multicast beam recovery procedures. In particular, by leveraging signaling used for recovery of unicast beams, techniques described herein may enable improved multicast beam recovery and may reduce control signaling overhead associated with multicast beam recovery within the wireless communications system 100. Moreover, by facilitating fast and efficient recovery of multicast beams, data transfer via the multicast beams may be restored, leading to more efficient wireless communications and improved consumer experience.

Figure 2:
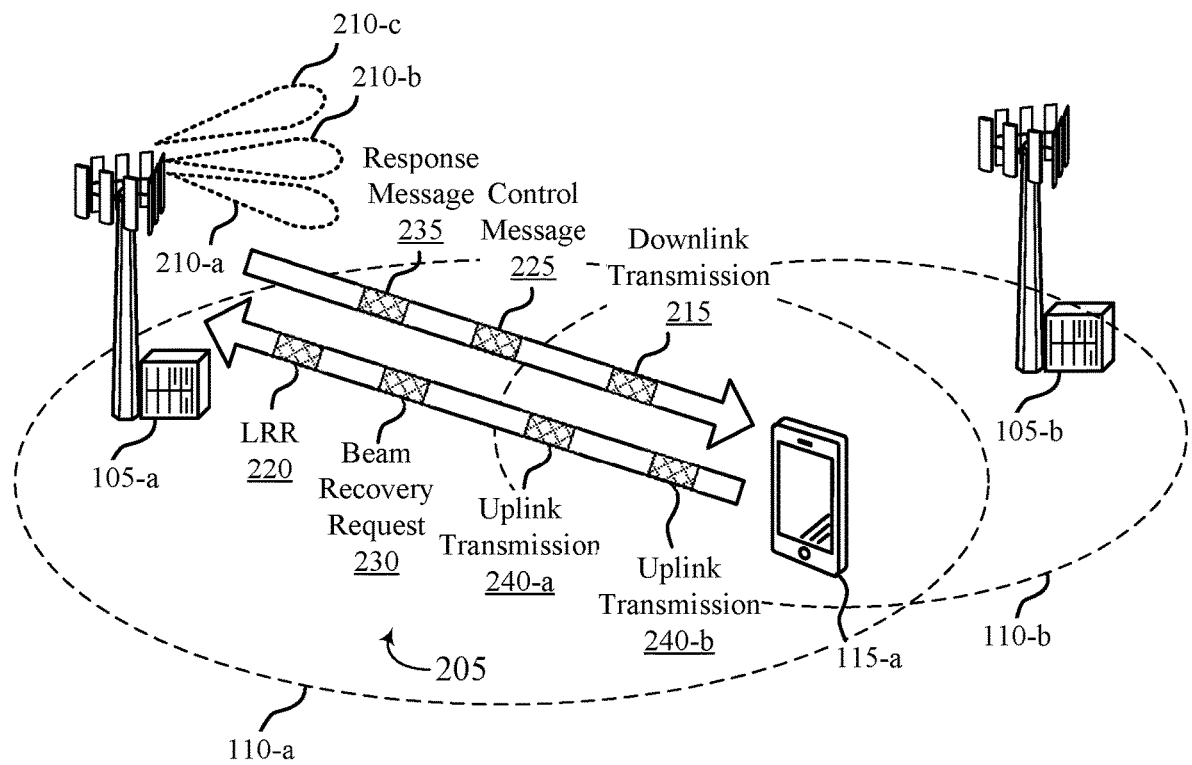
FIG. 2 illustrates an example of a wireless communications system that supports techniques for multicast beam failure and recovery in accordance with aspects of the present disclosure.

FIG. 2 illustrates an example of a wireless communications system 200 that supports techniques for multicast beam failure and recovery in accordance with aspects of the present disclosure. In some examples, wireless communications system 200 may implement aspects of wireless communications system 100. The wireless communications system 200 may include a first base station 105-a, a second base station 105-b, and a UE 115-a, which may be examples of base stations 105 and UEs 115 as described with reference to FIG. 1.

The UE 115-a may communicate with the first base station 105-a using a communication link 205. In some cases, the communication link 205 may include an example of an access link (e.g., a 3GPP Uu link). The communication link 205 may include a bi-directional link that can include both uplink and downlink communication. For example, the UE 115-a may transmit uplink transmissions, such as uplink control signals or uplink data signals, to the first base station 105-a using the communication link 205, and the first base station 105-a may transmit downlink transmissions, such as downlink control signals or downlink data signals, to the UE 115-a using the communication link 205.

The first base station 105-a may serve geographic coverage area 110-a, and the second base station 105-b may serve geographic coverage area 110-b. In some aspects, the first base station 105-a and the second base station 105-b may include cells of a single frequency network, and may exchange signaling to perform single frequency network coordination. In some aspects, single frequency network coordination may be performed by the first base station 105-a and the second base station 105-b to synchronize time and frequency resources transmitted by the respective base stations 105-a and 105-b.

In some aspects, the UE 115-a may communicate with the first base station 105-a and/or the second base station 105-b (e.g., communicate with the single frequency network) via one or more beams 210. For example, the UE 115-a may communicate with the first base station 105-a over the communication link 205 via a multicast beam 210-a, which may be an example of a single-cell multicast beam, a multi-cell multicast beam, or both. By way of another example, the UE 115-a may communicate with the first base station 105-a via a unicast beam 210-b, which may be an example of a single-cell unicast beam.

As noted previously herein, a UE may trigger a unicast beam recovery procedure in order to recover a unicast beam. In some cases, multicast transmissions from one or more base stations 105 to groups of UEs 115 may utilize multicast beams which are different from unicast beams to reach the UEs 115. Additionally, multicast beam failure may be independent from unicast beam failure, and may require recovery of the multicast beam to perform the multicast transmissions. However, some wireless communications systems do not support beam recovery procedures for multicast beams. For example, some wireless communications systems may not support beam recovery procedures for the multicast beam 210-a illustrated in FIG. 2.

Accordingly, the wireless communications system 200 may support communications for determining multicast beam failure and performing multicast beam recovery. In some aspects, techniques for multicast beam recovery may leverage signaling used for unicast beam recovery in order to perform multicast beam recovery.

For example, the UE 115-a may receive one or more downlink transmissions 215 (e.g., reference signals, downlink messages) from the first base station 105-a. In some aspects, the UE 115-a may receive the downlink transmissions 215 via a physical downlink control channel (PDCCH), a physical downlink shared channel (PDSCH), or both. Moreover, the first base station 105-a may transmit the downlink transmissions 215, and the UE 115-d may receive the downlink transmissions 215, via the multicast beam 210-a associated with multicast communications between the first base station 105-a and the UE 115-a. In some aspects, the multicast beam 210-a may include a single-cell multicast beam 210-a, a multi-cell multicast beam 210-a, or both. In cases where the multicast beam 210-a includes a multi-cell multicast beam 210-a associated with the first base station 105-a and the second base station 105-b (e.g., associated with the single frequency network), the UE 115-a may receive the one or more downlink transmissions 215 from the first base station 105-a and/or the second base station 105-b via the multicast beam 210-a.

The UE 115-a may perform one or more measurements on the downlink transmissions 215 received from the first base station 105-a via the multicast beam 210-a. In some aspects, the UE 115-a may determine one or more beam parameters associated with the multicast beam 210-a based on the one or more measurements. The one or more beam parameters associated with the multicast beam 210-a may include, but are not limited to, an RSRP value, an RSRQ value, an SNR value, an SINR value, and the like. For example, the measurements may include layer one (L1) RSRP, RSRQ, or SINR measurements based on downlink reference signals configured for multicast beam management (e.g., periodic 1-port non-zero-power channel state information reference signal (CSI-RS) or a synchronization signal block (SSB) associated with multicast transmission), where the transmission is received from the first base station 105-a and/or the second base station 105-b using the multicast beam over PDCCH and/or PDSCH.

In some aspects, the UE 115-a may evaluate the multicast beam 210-a based on the one or more measurements and/or determined beam parameters. For example, the UE 115-a may compare the one or more beam parameters with one or more beam parameter thresholds in order to evaluate a strength or quality of the multicast beam 210-a. In this regard, the UE 115-a may compare the one or more beam parameters to one or more beam parameter thresholds used for multicast beam evaluation to identify a potential failure (e.g., interruption) of the multicast beam 210-a. For instance, in cases where the UE 115-a determines an RSRP value and an SINR value associated with the multicast beam 210-a, the UE 115-a may compare the RSRP value to an RSRP threshold, and compare the SINR value to an SINR threshold. In additional or alternative aspects, the UE 115-a may be configured to determine the failure of the multicast beam 210-a via parameters signaled by radio resource control (RRC) signaling from the first base station 105-a, a PDCCH transmission configuration indicator (TCI) state, channel state information (CSI) signaling, synchronization signal block (SSB) signaling, or any combination thereof.

In some aspects, the UE 115-a may determine whether a beam parameter satisfies a respective beam parameter threshold based on the comparison. In some aspects, RSRP values and/or RSRQ values may satisfy an RSRP threshold and an RSRQ threshold, respectively, if the RSRP value and/or the RSRQ value is less than or equal to the respective threshold. Similarly, SNR values and/or SINR values may satisfy an SNR threshold and an SINR threshold, respectively, if the SNR value and/or the SINR value is less than or equal to the respective threshold.

In some aspects, the one or more beam parameter thresholds may be preconfigured and/or signaled to the UE 115-a via control signaling, configuration signaling, or both. For example, the first base station 105-c and/or the second base station 105-d may indicate the one or more beam parameter thresholds to use for multicast beam evaluation via RRC signaling. For instance, the base station 105-c may indicate a beam parameter threshold which is 10% of a PDCCH block error rate (BLER) for a downlink grant associated with a group radio network temporary identifier (RNTI) configured for multicast transmissions. In some cases, the one or more beam parameter thresholds used for multicast beam evaluation may be the same or different as beam parameter thresholds which are used by the UE 115-a for unicast beam evaluation.

The UE 115-a may determine a failure (e.g., interruption) of the multicast beam 210-a based on the measurements performed. For example, the UE 115-a may determine one or more beam parameters (e.g., RSRP values, RSRQ values, SNR values, SINR values) associated with the multicast beam 210-a based on the measurements performed on the downlink transmissions 215, and may compare the one or more beam parameters to one or more beam parameter thresholds used for multicast beam evaluation. In this example, the UE 115-a may determine the failure of the multicast beam 210-a based on the comparison. For instance, the UE 115-a may determine the failure of the multicast beam 210-a if at least one beam parameter of the one or more beam parameters satisfies at least one beam parameter threshold of the one or more beam parameter thresholds. In this regard, the UE 115-a may determine a failure of the multicast beam 210-a if an RSRP value, an RSRQ value, an SNR value, and/or an SINR value associated with the multicast beam 210-a is less than or equal to a respective threshold. In additional or alternative aspects, the UE 115-a may determine the failure of the multicast beam 210-a based on signaling received from the first base station 105-a and/or the second base station 105-b.

In some aspects, the UE 115-a may transmit a link recovery request 220 to the first base station 105-a. In some aspects, the link recovery request 220 may include an indication of a multicast beam recovery procedure and/or an indication of the multicast beam 210-a (e.g., multicast beam index associated with the multicast beam 210-a). In some cases, the UE 115-a may transmit the link recovery request 220 based on identifying the failure of the multicast beam 210-a. In some aspects, the UE 115-a may transmit the link recovery request 220 via a unicast beam 210-b associated with unicast communications between the UE 115-a and the first base station 105-a. Additionally, or alternatively, the UE 115-a may transmit the link recovery request 220 via a physical uplink control channel (PUCCH), a physical random access channel (PRACH), or both, associated with the multicast beam recovery procedure.

In some aspects, the UE 115-a may indicate a request for multicast services. For example, the UE 115-a may indicate a request for multicast services during an RRC setup/connection procedure. In such cases, the request for multicast services may additionally include an indication of priority indicating whether the multicast service is to be prioritizes over unicast service. In this regard, the request for multicast services may include an indication of priority indicating that multicast beam recovery procedure is to be prioritized over other beam recovery procedures (e.g., a unicast beam recovery procedure). For example, in addition to determining a failure of the multicast beam 210-a, the UE 115-a may additionally determine a failure of a unicast beam 210-b associated with unicast communications between the UE 115-a and the base station 105-a. In this example, the UE 115-a may determine a priority between the multicast beam recovery procedure associated with the multicast beam 210-a, and a unicast beam recovery procedure associated with the unicast beam 210-b based on the failure of the unicast beam 210-b. Accordingly, the UE 115-a may transmit the link recovery request 220 associated with the multicast beam recovery procedure based on determining the priority.

In some cases, the failure of the unicast beam 210-b may result in radio link failure. Accordingly, in some cases, the UE 115-a may be configured to prioritize the unicast beam recovery procedure over the multicast beam recovery procedure in order to maintain the RRC connection with the serving cell. For example, the UE 115-a may prioritize the unicast beam recovery procedure with a primary cell (e.g., first base station 105-a), a secondary cell (e.g., second base station 105-b), or both, over the multicast beam recovery procedure. For instance, the UE 115-a may determine that the unicast beam recovery procedure associated with the unicast beam 210-b between the UE 115-a and the first base station 105-a has a higher priority than the multicast beam recovery procedure. In this example, the UE 115-a may perform the unicast beam recovery procedure based on determining the unicast beam recovery procedure has a higher priority.

Additionally, or alternatively, the UE 115-a may be configured to prioritize the multicast beam recovery procedure over a unicast beam recovery procedure with a primary cell (e.g., first base station 105-a), a secondary cell (e.g., second base station 105-b), or both. For example, the UE 115-a may determine that the multicast beam recovery procedure associated with the multicast beam 210-a between the UE 115-a and the first base station 105-a has a higher priority than the unicast beam recovery procedure. In this example, the UE 115-a may perform the multicast beam recovery procedure (e.g., transmit the link recovery request 220) based on determining the multicast beam recovery procedure has a higher priority.

In some cases, it may be up to UE 115-a implementation to determine the priority between the multicast beam recovery procedure and the unicast beam recovery procedure. For example, the UE 115-a may be configured with dedicated resources for a link recovery request 220 for the multicast beam recovery procedure associated with the multicast beam 210-a, dedicated resources for a link recovery request for a second beam recovery procedure (e.g., unicast beam recovery procedure) associated with the unicast beam 210-b, or both. In this example, the UE 115-a may determine to prioritize the second beam recovery procedure (e.g., unicast beam recovery procedure) for the unicast beam 210-b associated with the primary cell (e.g., first base station 105-a) to maintain the RRC connection with the primary cell, but may prioritize the link recovery request 220 of the multicast beam recovery procedure over a unicast beam recovery procedure for a unicast beam associated with a secondary cell (e.g., the second base station 105-*b*).

In additional or alternative aspects, the link recovery request 220 may include a scheduling request for a beam recovery request 230. For example, the UE 115-*a* may transmit the link recovery request 220 including a scheduling request for transmitting a beam recovery request 230 (e.g., BFR request) from the UE 115-*a* to the first base station 105-*a*, as will be discussed in further detail herein.

In some aspects, the UE 115-*a* may receive an indication of a unicast uplink grant from the first base station 105-*a*. For example, in some cases, the first base station 105-*a* may transmit a control message 225 indicating the unicast uplink grant in response to receiving the link recovery request 220. In some aspects, the unicast uplink grant may include a set of uplink resources (e.g., time/frequency resources) associated with the multicast beam recovery procedure. In some aspects, the first base station 105-*c* may transmit the control message 225 including the indication of the unicast uplink grant in response to receiving the link recovery request 220. In some aspects, the first base station 105-*a* may transmit the indication of the unicast uplink grant based on an indication of priority indicated in the link recovery request 220, a scheduling request indicated in the link recovery request 220, or any combination thereof. In some cases, the first base station 105-*a* may transmit the control message 225 including the indication of the unicast grant via the unicast beam 210-*b* between the UE 115-*a* and the first base station 105-*a*.

The UE 115-*a* may determine the unicast uplink grant including the set of resources associated with the multicast beam recovery procedure. In some cases, the UE 115-*a* may determine the unicast uplink grant based on determining the multicast beam failure, transmitting the link recovery request 220, receiving the indication of the unicast uplink grant (e.g., receiving the control message 225 including the unicast uplink grant), or any combination thereof.

Additionally, or alternatively, the UE 115-*a* may determine the unicast uplink grant without transmitting the link recovery request 220 and/or receiving the control message 225 including the unicast uplink grant. For example, in some cases, the UE 115-*a* may already have a unicast uplink grant for uplink data transmission or a unicast uplink grant for uplink feedback/reporting. For instance, the UE 115-*a* may combine or "piggyback" the beam recovery request 230 for multicast transmissions on the uplink data without transmitting the link recovery request 220 and/or receiving the control message 225 including the indication of the unicast uplink grant.

In some aspects, the UE 115-*a* may identify one or more candidate beams for communications between the UE 115-*a* and the first base station 105-*a*. The one or more candidate beams may include unicast beams, additional multicast beams, or both. For example, the UE 115-*a* may receive one or more signals or messages (e.g., reference signals) from the first base station 105-*a* via a set of potential candidate beams. The set of potential candidate beams may include unicast beams and/or multicast beams which are different from the multicast beam associated with the multicast beam recovery procedure. The UE 115-*a* may perform one or more measurements on the messages/signals received via the set of potential candidate beams, and may determine beam parameters (e.g., RSRP values, RSRQ values, SNR values, SINR values) associated with each of the potential candidate beams. In some aspects, the UE 115-*a* may compare the beam parameters associated with each potential candidate beam of the set of potential candidate beams with beam parameter thresholds. In some aspects, the beam parameter thresholds used to evaluate the set of potential candidate beams may be the same or different as the beam parameter thresholds used to determine a failure of the multicast beam 210-*a*. In this regard, the UE 115-*a* may determine the one or more candidate beams from the set of potential candidate beams based on measurements performed on the set of potential candidate beams.

In some aspects, the UE 115-*a* may transmit a beam recovery request 230 to the first base station 105-*a*. The beam recovery request 230 may include an indication of the multicast beam recovery procedure, an indication of the multicast beam 210-*a* (e.g., multicast beam index associated with the multicast beam 210-*a*), or both. In some aspects, the UE 115-*a* may transmit the beam recovery request 230 based on determining a failure of the multicast beam 210-*a*, receiving the control message 225 including the unicast uplink grant, determining the unicast uplink grant, or any combination thereof.

In some aspects, the UE 115-*a* may transmit the beam recovery request 230 based on a determined priority between the multicast beam recovery procedure and a unicast beam recovery procedure. For example, as noted previously herein, the UE 115-*a* may determine that a unicast beam recovery procedure associated with the unicast beam 210-*b* has a higher priority than the multicast beam recovery procedure associated with the multicast beam 210-*a*. In this example, the UE 115-*a* may perform the unicast beam recovery procedure based on the determined priority, and may transmit the beam recovery request 230 based on (e.g., after or in response to) performing the unicast beam recovery procedure. By way of another example, the UE 115-*a* may determine that the multicast beam recovery procedure has a higher priority than the unicast beam recovery procedure. In this example, the UE 115-*a* may transmit the beam recovery request 230 via a dedicated PRACH based on determining the multicast beam recovery procedure has a higher priority than the unicast beam recovery procedure.

In cases where the UE 115-*a* determines one or more candidate beams (e.g., multicast beams, unicast beams) for communicating with the first base station 105-*a*, the beam recovery request 230 may include an indication of the one or more candidate beams (e.g., an indication of beam indexes associated with the one or more candidate beams). Additionally, or alternatively, if the UE 115-*a* determines that no candidate beams meet requisite strength or performance requirements based on measurements performed on the candidate beams, the beam recovery request 230 may be transmitted without any indication of a candidate beam. In some cases, an absence of potential candidate beams may be indicated to the first base station 105-*a* explicitly and/or implicitly. For example, the UE 115-*a* may indicate the absence of any potential candidate beams via an explicit indication in the beam recovery request 230. Additionally, or alternatively, an absence of any potential candidate beams may be indicated to the first base station 105-*a* implicitly via an absence of any indication of potential candidate beams. In some cases, the UE 115-*a* may refrain from identifying candidate beams (and may therefore not indicate any candidate beams to the first base station 105-*a*) in order to expedite the multicast beam recovery procedure.

Moreover, in cases where the UE 115-*a* determines one or more beam parameters (e.g., RSRP values, RSRQ values, SNR values, SINR values) associated with the multicast beam 210-*a*, the beam recovery request 230 may include an indication of the one or more beam parameters associated with the multicast beam 210-*a*. In this regard, the UE 115-*a* may report the beam parameters associated with the failed multicast beam 210-*a* to the first base station 105-*a* via the beam recovery request 230. Similarly, the beam recovery request 230 may include an indication of the one or more beam parameters associated with the one or more candidate beams.

In some aspects, the UE 115-*a* may transmit the beam recovery request 230 via a PUCCH (e.g., dedicated multi-bit PUCCH), a MAC-CE message, an RRC message, or any combination thereof. For example, the beam recovery request 230 may include a MAC-CE message transmitted via physical uplink shared channel (PUSCH). By way of another example, the beam recovery request 230 may include an RRC message transmitted via PUSCH. It is noted herein that a quantity of data which may be transmitted via PUCCH transmissions, MAC-CE messages, and RRC messages may vary. For example, PUCCH transmissions and MAC-CE messages may have limited capacity, and may only be able to indicate the failed beam index of the multicast beam 210-*a* and up to one indication of a candidate beam. Comparatively, by way of another example, an RRC message transmitted via PUSCH may have increased capacity, and may be able to indicate the failed beam index of the multicast beam 210-*a*, indications associated with multiple candidate beams, and a measurement report associated with the multicast beam 210-*a*. Accordingly, the beam recovery request 230 may be transmitted via a PUCCH, MAC-CE message, and/or RRC message depending on a quantity of data/information which is being relayed via the beam recovery request 230 (e.g., indications of candidate beams, indications of beam parameters).

In some aspects, the UE 115-*a* may receive a response message 235 from the first base station 105-*a*. In some cases, the response message 235 may include an indication of a second uplink grant, an indication of a second beam 210-*c* for communications between the UE 115-*a* and the first base station 105-*a*, or both. The response message 235 may additionally include an indication of a cell radio network temporary identifier (C-RNTI), a modulation and coding scheme C-RNTI (MCS-C-RNTI), or both. In some aspects, the first base station 105-*a* may transmit the response message 235 in response to receiving the beam recovery request 230. For example, the response message 235 may include an acknowledgement (e.g., ACK) of the beam recovery request 230. By way of another example, the first base station 105-*a* may transmit the response message 235 based on one or more indications indicated in the beam recovery request 230 including, but not limited to, an indication of the multicast beam recovery procedure, a multicast beam index associated with the multicast beam 210-*a*, an indication of one or more candidate beams, an indication of the one or more beam parameters associated with the multicast beam 210-*c*, or any combination thereof.

As noted previously herein, the response message 235 may include an indication of a second uplink grant, an indication of a second beam 210-*c*, or both. The second uplink grant may include a second unicast uplink grant including a set of uplink resources for uplink transmissions from the UE 115-*a* to the first base station 105-*a*. In cases where the response message 235 includes an indication of a second beam 210-*c*, the second beam 210-*c* may include a unicast beam and/or a second multicast beam different from the failed multicast beam 210-*a*. In some aspects, the second beam 210-*c* may include a candidate beam identified by the UE 115-*a*. For example, in cases where the UE 115-*a* identifies one or more candidate beams and indicates the one or more candidate beams to the first base station 105-*a* via the beam recovery request 230, the second beam 210-*c* indicated by the response message 235 may include a candidate beam of the one or more candidate beams indicated in the beam recovery request 230. In cases where the first base station 105-*a* indicates the second beam 210-*c* which includes a candidate beam, the first base station 105-*a* may select the second beam 210-*c* from the one or more candidate beams based on the beam parameters associated with the candidate beams indicated via the beam recovery request 230.

In some aspects, the response message 235 may include an indication of two or more beams. In particular, the response message 235 may include an indication of a first beam for retransmitting downlink transmissions from the first base station 105-*a* to the UE 115-*a*, and a second beam for transmitting new downlink transmissions from the first base station 105-*a* to the UE 115-*a*. For example, the response message 235 may include an indication of the multicast beam 210-*c* and the second beam 210-*c*. In this example, the UE 115-*a* may receive, from the first base station 105-*a*, a retransmission of a first downlink transmission via the multicast beam 210-*a* based on the indication of the multicast beam 210-*a*. Additionally, the UE 115-*a* may receive, from the first base station 105-*a*, a second downlink transmission (e.g., new downlink transmission) via the second beam 210-*c* based on the indication of the second beam 210-*c*.

In some cases, the response message 235 may include an indication of two new beams 210 different from the multicast beam 210-*c*, where the two beams are intended for retransmissions and new transmissions, respectively. For example, the response message 235 may include an indication of the second beam 210-*c* and a third beam 210 (e.g., the unicast beam 210-*b* or another beam not shown). In this example, the UE 115-*a* may receive, from the first base station 105-*a*, a retransmission of a first downlink transmission via the second beam 210-*c* based on the indication of the second beam 210-*b*. Additionally, the UE 115-*a* may receive, from the first base station 105-*a*, a second downlink transmission via the third beam 210 based on the indication of the third beam 210.

In some aspects, the UE 115-*a* may transmit a first uplink transmission 240-*a* to the first base station 105-*a*. In some aspects, the first uplink transmission 240-*a* may be transmitted to the first base station 105-*a* via the second uplink grant indicated in the response message 235, the second beam 210-*c* indicated in the response message 235, or both. For example, in cases where the response message 235 indicates a second beam 210-*c* (e.g., a unicast beam or a second multicast beam) for communications between the UE 115-*a* and the first base station 105-*a*, the UE 115-*a* may transmit the first uplink transmission 240-*a* based on (e.g., according to) the second beam 210-*c* indicated in the response message 235. By way of another example, in cases where the response message 235 includes an indication of a second uplink grant, the UE 115-*a* may transmit the first uplink transmission 240-*a* based on (e.g., according to) the second uplink grant indicated in the response message 235.

In cases where the which the first uplink transmission 240-*a* is transmitted based on the second uplink grant, and where the UE 115-*a* indicates one or more candidate beams in the beam recovery request 230, the UE 115-*a* may be configured to transition to performing uplink transmissions 240 according to the one or more candidate beams based on explicit signaling received from the first base station 105-*a*, a timer, or both. For example, the UE 115-*a* may perform the first uplink transmission 240-a according to the second uplink grant indicated in the response message 235, and may perform subsequent uplink transmissions 240 (e.g., a second uplink transmission 240-b) based on a downlink message received from the first base station 105-a. In this regard, a control resource set (CORESET) may be reset to perform subsequent uplink transmissions according to a new beam.

In some cases, the UE 115-a may determine to transition to performing uplink transmissions 240 according to the one or more candidate beams based on an expiration of a timer. The timer may be configured to indicate to the UE 115-a when the UE 115-a is to perform uplink transmissions 240 based on (e.g., according to) the one or more candidate beams identified by the UE 115-a. In some cases, the UE 115-a and/or the first base station 105-a may initiate the timer based on receiving or transmitting the response message 235, respectively. Moreover, the UE 115-a may determine an expiration of the timer based on a timer duration. The timer duration may be preconfigured and/or signaled to the UE 115-a. For example, in some cases, the timer duration may be configured for 28 symbols. In some aspects, the UE 115-a and/or the base station 105-a may initiate the timer based on receiving or transmitting the response message 235, respectively.

If the UE 115-a determines that the timer has not expired, the UE 115-a may repeat the evaluation of the timer. The UE 115-a may be configured to determine whether the timer has expired at regular or irregular intervals. Upon determining that the timer has expired, the UE 115-a may transmit a second uplink transmission 240-b to the first base station 105-a based on the expiration of the timer. In some aspects, the second uplink transmission 240-b may be transmitted to the first base station 105-a via the one or more candidate beams identified by the UE 115-a and/or indicated to the first base station 105-a via the beam recovery request 230.

The techniques described herein may enable more efficient and reliable recovery of multicast beams. In particular, the techniques described herein may facilitate multicast beam recovery by leveraging signaling used for unicast beam recovery, which may expedite the multicast beam recovery procedure and lead to more efficient and reliable communications within a wireless communications system.

Figure 3:
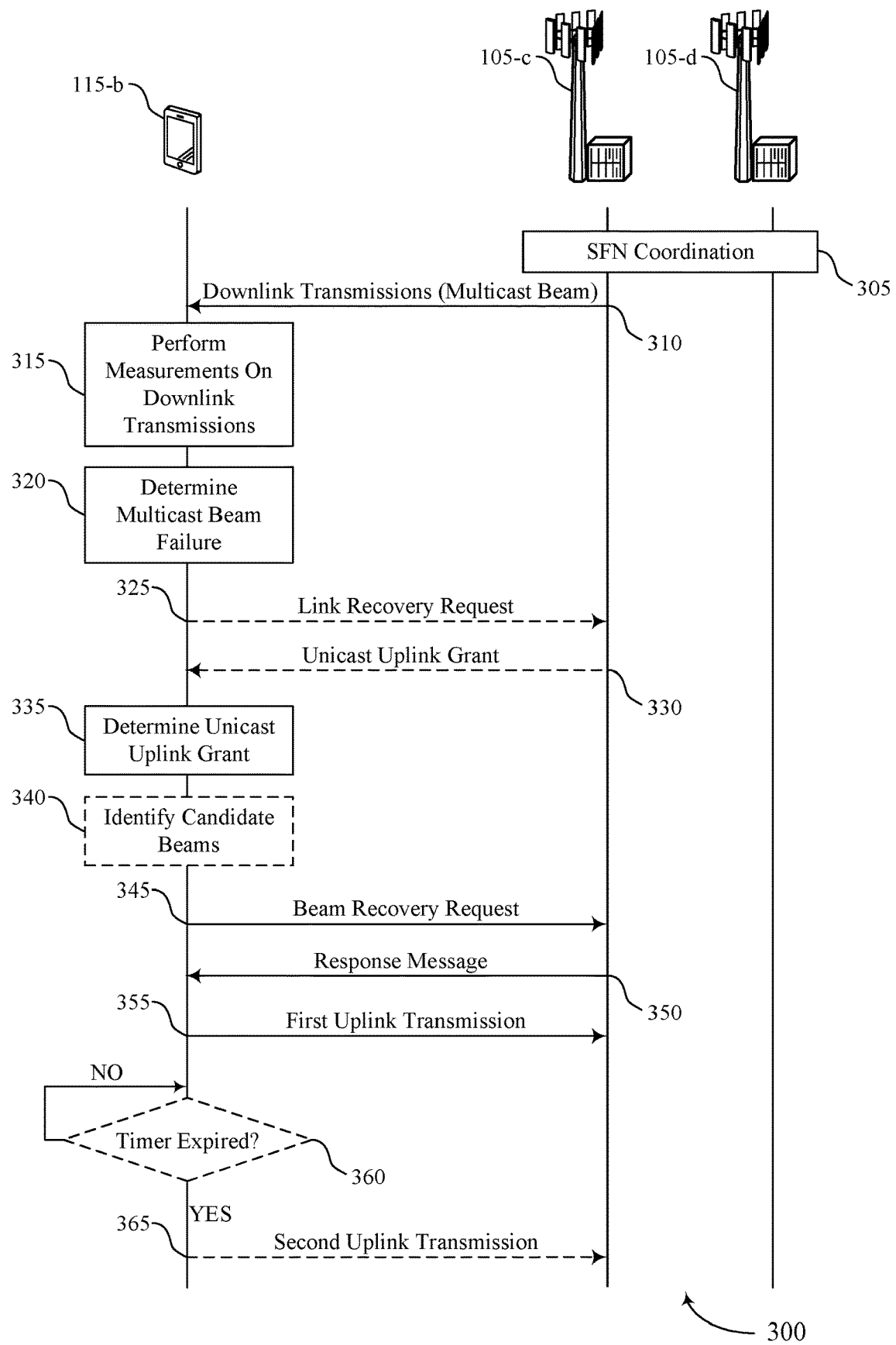
FIG. 3 illustrates an example of a process flow that supports techniques for multicast beam failure and recovery in accordance with aspects of the present disclosure.

FIG. 3 illustrates an example of a process flow 300 that supports techniques for multicast beam failure and recovery in accordance with aspects of the present disclosure. In some examples, process flow 300 may implement aspects of wireless communications system 100 or 200. The process flow 300 may illustrate identifying a failure of a multicast beam, determining a unicast uplink grant, transmitting a beam recovery request, receiving a response message responsive to the beam recovery request, and transmitting uplink transmissions, as described with reference to FIGS. 1-2, among other aspects.

In some aspects, process flow 300 may include a UE 115-b, a first base station 105-c, and a second base station 105-d, which may be examples of corresponding devices as described herein. The UE 115-b illustrated in FIG. 3 may be an example of the UE 115-a illustrated in FIG. 2 which communicates with one or more base stations 105 via a multicast beam. Similarly, the first base station 105-c and the second base station 105-d illustrated in FIG. 3 may be examples of the first base station 105-a and the second base station 105-b, respectively, as illustrated in FIG. 2.

In some aspects, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the first base station 105-c and the second base station 105-d may coordinate an single frequency network connection. In some aspects, the first base station 105-c and the second base station 105-d may include cells of an single frequency network, and may exchange signaling to perform single frequency network coordination at 305. In some aspects, single frequency network coordination may be performed by the first base station 105-c and the second base station 105-d to synchronize time and frequency resources transmitted by the respective base stations 105-c and 105-d.

At 310, the UE 115-b may receive one or more downlink transmissions (e.g., reference signals, downlink messages) from the first base station 105-c. In some aspects, the first base station 105-c may transmit the downlink transmissions, and the UE 115-b may receive the downlink transmissions, via a multicast beam associated with multicast communications between the first base station 105-c and the UE 115-b. In some aspects, the multicast beam may include a single-cell multicast beam. Additionally, or alternatively, the multicast beam may include a multi-cell multicast beam. In cases where the multicast beam includes a multi-cell multicast beam associated with the first base station 105-c and the second base station 105-d (e.g., associated with the single frequency network), the UE 115-b may receive the one or more downlink transmissions at 310 from the first base station 105-c and/or the second base station 105-d.

At 315, the UE 115-b may perform one or more measurements on the downlink transmissions received from the first base station 105-c via the multicast beam. In some aspects, the UE 115-b may determine one or more beam parameters associated with the multicast beam based on the one or more measurements. The one or more beam parameters associated with the multicast beam may include, but are not limited to, an RSRP value, an RSRQ value, an SNR value, an SINR value, and the like.

In some aspects, the UE 115-b may evaluate the multicast beam based on the one or more measurements and/or beam parameters determined at 315. For example, the UE 115-b may compare the one or more beam parameters with one or more beam parameter thresholds in order to evaluate a strength or quality of the multicast beam. In this regard, the UE 115-b may compare the one or more beam parameters to one or more beam parameter thresholds used for multicast beam evaluation to identify a potential failure (e.g., interruption) of the multicast beam. For instance, in cases where the UE 115-b determines an RSRP value and an SINR value associated with the multicast beam, the UE 115-b may compare the RSRP value to an RSRP threshold, and compare the SINR value to an SINR threshold.

In some aspects, the UE 115-b may determine whether a beam parameter satisfies a respective beam parameter threshold based on the comparison. In some aspects, RSRP values and/or RSRQ values may satisfy an RSRP threshold and an RSRQ threshold, respectively, if the RSRP value and/or the RSRQ value is less than or equal to the respective threshold. Similarly, SNR values and/or SINR values may satisfy an SNR threshold and an SINR threshold, respectively, if the SNR value and/or the SINR value is less than or equal to the respective threshold.

In some aspects, the one or more beam parameter thresholds may be preconfigured and/or signaled to the UE 115-b via control signaling, configuration signaling, or both. For example, the first base station 105-*c* and/or the second base station 105-*d* may indicate the one or more beam parameter thresholds to use for multicast beam evaluation via RRC signaling. In some cases, the one or more beam parameter thresholds used for multicast beam evaluation may be the same or different as beam parameter thresholds which are used by the UE 115-*b* for unicast beam evaluation.

At 320, the UE 115-*b* may determine a failure (e.g., interruption) of the multicast beam. In some aspects, the UE 115-*b* may determine the failure of the multicast beam based on the measurements performed at 315. For example, the UE 115-*b* may determine one or more beam parameters (e.g., RSRP values, RSRQ values, SNR values, SINR values) associated with the multicast beam based on the measurements performed at 315, and may compare the one or more beam parameters to one or more beam parameter thresholds used for multicast beam evaluation. In this example, the UE 115-*b* may determine the failure of the multicast beam based on the comparison. For instance, the UE 115-*b* may determine the failure of the multicast beam if at least one beam parameter of the one or more beam parameters satisfies at least one beam parameter threshold of the one or more beam parameter thresholds. In this regard, the UE 115-*b* may determine a failure of the multicast beam if an RSRP value, an RSRQ value, an SNR value, and/or an SINR value associated with the multicast beam is less than or equal to a respective threshold. In additional or alternative aspects, the UE 115-*b* may determine the failure of the multicast beam based on signaling received from the first base station 105-*d* and/or the second base station 105-*f*.

At 325, the UE 115-*b* may transmit a link recovery request to the first base station 105-*d*. In some aspects, the link recovery request may include an indication of a multicast beam recovery procedure and/or an indication of the multicast beam (e.g., multicast beam index associated with the multicast beam). In some cases, the UE 115-*b* may transmit the link recovery request based on identifying the failure of the multicast beam. In some aspects, the UE 115-*b* may transmit the link recovery request via a unicast beam associated with unicast communications between the UE 115-*b* and the first base station 105-*d*. Additionally, or alternatively, the UE 115-*b* may transmit the link recovery request via a PUCCH, a PRACH, or both, associated with the multicast beam recovery procedure.

In some aspects, the UE 115-*b* may determine a priority between the multicast beam recovery procedure and other beam recovery procedures (e.g., a unicast beam recovery procedure). For example, the UE 115-*b* may additionally determine a failure of a unicast beam associated with unicast communications between the UE 115-*b* and the base station 105-*c*. In this example, the UE 115-*b* may determine a priority between the multicast beam recovery procedure associated with the multicast beam, and a unicast beam recovery procedure associated with the unicast beam based on the failure of the unicast beam. Accordingly, the UE 115-*b* may transmit the link recovery request associated with the multicast beam recovery procedure at 325 based on determining the priority.

The failure of the unicast beam may result in radio link failure. Accordingly, in some cases, the UE 115-*b* may be configured to prioritize the unicast beam recovery procedure over the multicast beam recovery procedure. For example, the UE 115-*b* may prioritize the unicast beam recovery procedure with a primary cell (e.g., first base station 105-*c*), a secondary cell (e.g., second base station 105-*d*), or both, over the multicast beam recovery procedure. For example, the UE 115-*b* may determine that the unicast beam recovery procedure associated with the unicast beam between the UE 115-*b* and the first base station 105-*c* has a higher priority than the multicast beam recovery procedure. In this example, the UE 115-*b* may perform the unicast beam recovery procedure based on determining the unicast beam recovery procedure has a higher priority.

Additionally, or alternatively, the UE 115-*b* may be configured to prioritize the multicast beam recovery procedure over a unicast beam recovery procedure with a primary cell (e.g., first base station 105-*c*), a secondary cell (e.g., second base station 105-*d*), or both. For example, the UE 115-*b* may determine that the multicast beam recovery procedure associated with the multicast beam between the UE 115-*b* and the first base station 105-*c* has a higher priority than the unicast beam recovery procedure. In this example, the UE 115-*b* may perform the multicast beam recovery procedure (e.g., transmit the link recovery request) based on determining the multicast beam recovery procedure has a higher priority.

In some cases, the link recovery request may include an indication of priority between the multicast beam recovery procedure and the unicast beam recovery procedure. For example, the link recovery request may indicate that the multicast beam recovery procedure associated with the multicast beam has a higher priority (e.g., higher importance) than the unicast beam recovery procedure, a second multicast beam recovery procedure associated with a second multicast beam, or both. In some cases, the indication of priority may be indicated in a bit field of the link recovery request.

In additional or alternative aspects, the link recovery request may include a scheduling request for a beam recovery request. For example, the UE 115-*b* may transmit the link recovery request including a scheduling request for transmitting a beam recovery request (e.g., BFR request) from the UE 115-*b* to the first base station 105-*c*, as will be discussed in further detail herein.

At 330, the UE 115-*b* may receive an indication of a unicast uplink grant from the first base station 105-*f*. In some aspects, the unicast uplink grant may include a set of uplink resources (e.g., time/frequency resources) associated with the multicast beam recovery procedure. In some aspects, the first base station 105-*c* may transmit the indication of the unicast uplink grant in response to receiving the link recovery request. For example, in some cases, the first base station 105-*d* may transmit a control message indicating the unicast uplink grant in response to receiving the link recovery request. In some aspects, the first base station 105-*c* may transmit the indication of the unicast uplink grant based on an indication of priority indicated in the link recovery request, a scheduling request indicated in the link recovery request, or any combination thereof. In some cases, the base station 105-*c* may transmit the control message including the indication of the unicast grant via a unicast beam between the UE 115-*b* and the first base station 105-*c*.

At 335, the UE 115-*b* may determine the unicast uplink grant including the set of resources associated with the multicast beam recovery procedure. In some cases, the UE 115-*b* may determine the unicast uplink grant based on determining the multicast beam failure at 320, transmitting the link recovery request at 325, receiving the indication of the unicast uplink grant (e.g., control message including the unicast uplink grant) at 330, or any combination thereof.

Additionally, or alternatively, the UE 115-*b* may determine the unicast uplink grant without transmitting the link recovery request at 325 and/or receiving the unicast uplink grant at 330. For example, in some cases, the UE 115-*b* may be preconfigured with the unicast uplink grant. For instance, the UE 115-*b* may receive the unicast uplink grant associated with multicast beam recovery procedures during a setup procedure or other prior communications with the first base station 105-*d*, the second base station 105-*f*, or another device within a wireless communications system. In such examples where the UE 115-*b* is preconfigured with the unicast uplink grant, the UE 115-*b* may determine the unicast uplink grant including the set of uplink resources for the multicast beam recovery procedure at 335 without transmitting the link recovery request at 325 and/or receiving the indication of the unicast uplink grant at 330.

At 340, the UE 115-*b* may identify one or more candidate beams for communications between the UE 115-*b* and the first base station 105-*c*. The one or more candidate beams may include unicast beams, additional multicast beams, or both. For example, the UE 115-*b* may receive one or more signals or messages (e.g., reference signals) from the first base station 105-*c* via a set of potential candidate beams. The set of potential candidate beams may include unicast beams and/or multicast beams which are different from the multicast beam associated with the multicast beam recovery procedure. The UE 115-*b* may perform one or more measurements on the messages/signals received via the set of potential candidate beams, and may determine beam parameters (e.g., RSRP values, RSRQ values, SNR values, SINR values) associated with each of the potential candidate beams. In some aspects, the UE 115-*b* may compare the beam parameters associated with each potential candidate beam of the set of potential candidate beams with beam parameter thresholds. In some aspects, the beam parameter thresholds used to evaluate the set of potential candidate beams may be the same or different as the beam parameter thresholds used at 315. In this regard, the UE 115-*b* may determine the one or more candidate beams from the set of potential candidate beams based on measurements performed on the set of potential candidate beams.

At 345, the UE 115-*b* may transmit a beam recovery request to the first base station 105-*c*. The beam recovery request may include an indication of the multicast beam recovery procedure, an indication of the multicast beam (e.g., multicast beam index associated with the multicast beam), or both. In some aspects, the UE 115-*b* may transmit the beam recovery request based on determining the multicast beam failure at 320, receiving the unicast uplink grant at 330, determining the unicast uplink grant at 335, or any combination thereof.

In some aspects, the UE 115-*b* may transmit the beam recovery request based on a determined priority between the multicast beam recovery procedure and a unicast beam recovery procedure. For example, as noted previously herein, the UE 115-*b* may determine that a unicast beam recovery procedure has a higher priority than the multicast beam recovery procedure. In this example, the UE 115-*b* may perform the unicast beam recovery procedure based on the determined priority, and may transmit the beam recovery request at 345 based on (e.g., after or in response to) performing the unicast beam recovery procedure. By way of another example, the UE 115-*b* may determine that the multicast beam recovery procedure has a higher priority than the unicast beam recovery procedure. In this example, the UE 115-*b* may transmit the beam recovery request via a dedicated PRACH based on determining the multicast beam recovery procedure has a higher priority than the unicast beam recovery procedure.

In cases where the UE 115-*b* determines one or more candidate beams (e.g., multicast beams, unicast beams) at 340, the beam recovery request may include an indication of the one or more candidate beams (e.g., an indication of beam indexes associated with the one or more candidate beams). Moreover, in cases where the UE 115-*b* determines one or more beam parameters (e.g., RSRP values, RSRQ values, SNR values, SINR values) associated with the multicast beam at 315, the beam recovery request may include an indication of the one or more beam parameters. In this regard, the UE 115-*b* may report the beam parameters associated with the failed multicast beam to the first base station 105-*f* via the beam recovery request. Similarly, the beam recovery request may include an indication of the one or more beam parameters associated with the one or more candidate beams.

In some aspects, the UE 115-*b* may transmit the beam recovery request via a PUCCH (e.g., dedicated multi-bit PUCCH), a MAC-CE message, an RRC message, or any combination thereof. For example, the beam recovery request may include a MAC-CE message transmitted via PUCCH. By way of another example, the beam recovery request may include an RRC message transmitted via PUSCH. It is noted herein that a quantity of data which may be transmitted via PUCCH transmissions, MAC-CE messages, and RRC messages may vary. Accordingly, the beam recovery request may be included within a MAC-CE message and/or RRC message depending on a quantity of data/information which is being relayed via the beam recovery request (e.g., indications of candidate beams, indications of beam parameters).

At 350, the UE 115-*b* may receive a response message from the first base station 105-*c*. In some cases, the response message may include an indication of a second uplink grant. Additionally, or alternatively, the response message may include an indication of a second beam for communications between the UE 115-*b* and the first base station 105-*c*. In some aspects, the first base station 105-*c* may transmit the response message at 350 in response to receiving the beam recovery request at 345. For example, the response message may include an acknowledgement (e.g., ACK) of the beam recovery request received at 345. By way of another example, the first base station 105-*c* may transmit the response message at 350 based on one or more indications indicated in the beam recovery request including, but not limited to, an indication of the multicast beam recovery procedure, a multicast beam index associated with the multicast beam, an indication of one or more candidate beams, an indication of the one or more beam parameters associated with the multicast beam, or any combination thereof.

As noted previously herein, the response message may include an indication of a second uplink grant, an indication of a second beam, or both. The second uplink grant may include a second unicast uplink grant including a set of uplink resources for uplink transmissions from the UE 115-*b* to the first base station 105-*c*. In cases where the response message includes an indication of a second beam, the second beam may include a unicast beam and/or a second multicast beam different from the failed multicast beam. In some aspects, the second beam may include a candidate beam identified by the UE 115-*b* at 340. For example, in cases where the UE 115-*b* identifies one or more candidate beams and indicates the one or more candidate beams to the first base station 105-*c* via the beam recovery request, the second beam indicated by the response message may include a candidate beam of the one or more candidate beams indicated in the beam recovery request. In cases where the first base station 105-*c* indicates the second beam which includes a candidate beam, the first base station 105-c may select the second beam from the one or more candidate beams based on the beam parameters associated with the candidate beams indicated via the beam recovery request.

In some aspects, the response message transmitted at 350 may include an indication of two or more beams. In particular, the response message may include an indication of a first beam for retransmitting downlink transmissions from the first base station 105-c to the UE 115-b, and a second beam for new downlink transmissions from the first base station 105-c to the UE 115-b. For example, the response message may include an indication of the multicast beam and a second beam. In this example, the UE 115-b may receive, from the first base station 105-c, a retransmission of a first downlink transmission via the multicast beam based on the indication of the multicast beam. Additionally, the UE 115-b may receive, from the first base station 105-c, a second downlink transmission via the second beam based on the indication of the second beam. In some cases, the response message may include an indication of two new beams different from the multicast beam, where the two beams are intended for retransmissions and new transmissions, respectively.

At 355, the UE 115-b may transmit a first uplink transmission to the first base station 105-f. In some aspects, the first uplink transmission may be transmitted to the first base station 105-c via the second uplink grant indicated in the response message, the second beam indicated in the response message, or both. For example, in cases where the response message received at 350 indicates a second beam (e.g., a unicast beam or a second multicast beam) for communications between the UE 115-b and the first base station 105-c, the UE 115-b may transmit the first uplink transmission based on (e.g., according to) the second beam indicated in the response message. By way of another example, in cases where the response message includes an indication of a second uplink grant, the UE 115-b may transmit the first uplink transmission based on (e.g., according to) the second uplink grant indicated in the response message.

In cases where the which the first uplink transmission at 355 is transmitted based on the second uplink grant, an where the UE 115-b indicates one or more candidate beams in the beam recovery request, the UE 115-b may be configured to transition to performing uplink transmissions according to the one or more candidate beams. The UE 115-b may be configured to transition to performing uplink transmissions according to the one or more candidate beams based on explicit signaling received from the first base station 105-c, a timer, or both. For example, the UE 115-b may perform the first uplink transmission according to the second uplink grant indicated in the response message, and may perform subsequent uplink transmissions (e.g., a second uplink transmission at 365) based on a downlink message received from the first base station 105-c.

In cases where the UE 115-b determines to transition to performing uplink transmissions according to the one or more candidate beams based on a timer, the process flow 300 may proceed to 360.

At 360, the UE 115-b may determine if a timer associated with a beam configuration has expired. The timer may be configured to indicate to the UE 115-b when the UE 115-b is to perform uplink transmissions based on (e.g., according to) the one or more candidate beams identified by the UE 115-b. In some cases, the UE 115-b and/or the first base station 105-c may initiate the timer based on receiving or transmitting the response message at 350, respectively.

Moreover, the UE 115-b may determine an expiration of the timer at 360 based on a timer duration. The timer duration may be preconfigured and/or signaled to the UE 115-b. In some aspects, the UE 115-b and/or the base station 105-c may initiate the timer based on receiving or transmitting the response message at 350, respectively.

If the UE 115-b determines that the timer has not expired at 360 (e.g., step 360 is "NO"), the UE 115-b may repeat the determination at 360. The UE 115-b may be configured to determine whether the timer has expired at regular or irregular intervals. If the UE 115-b determines that the timer has expired at 360 (e.g., step 360 is "YES"), process flow 300 may proceed to 365.

At 365, the UE 115-b may transmit a second uplink transmission to the first base station 105-f. In some aspects, the second uplink transmission may be transmitted to the first base station 105-c via the one or more candidate beams determined by the UE 115-b at 340 and/or indicated to the first base station 105-c via the beam recovery request. In some aspects, the UE 115-b may transmit the second uplink transmission via the one or more candidate beams based on determining an indication to transmit uplink transmissions according to the one or more candidate beams. For example, in some cases, the expiration of the timer may include an indication to perform uplink transmissions according to the one or more candidate beams. In this example, the UE 115-b may transmit the second uplink transmission at 365 according to the one or more candidate beams based on determining the expiration of the timer at 360.

The techniques described herein may enable more efficient and reliable recovery of multicast beams. In particular, the techniques described herein may facilitate multicast beam recovery by leveraging signaling used for unicast beam recovery, which may expedite the multicast beam recovery procedure and lead to more efficient and reliable communications within a wireless communications system.

Figure 4:
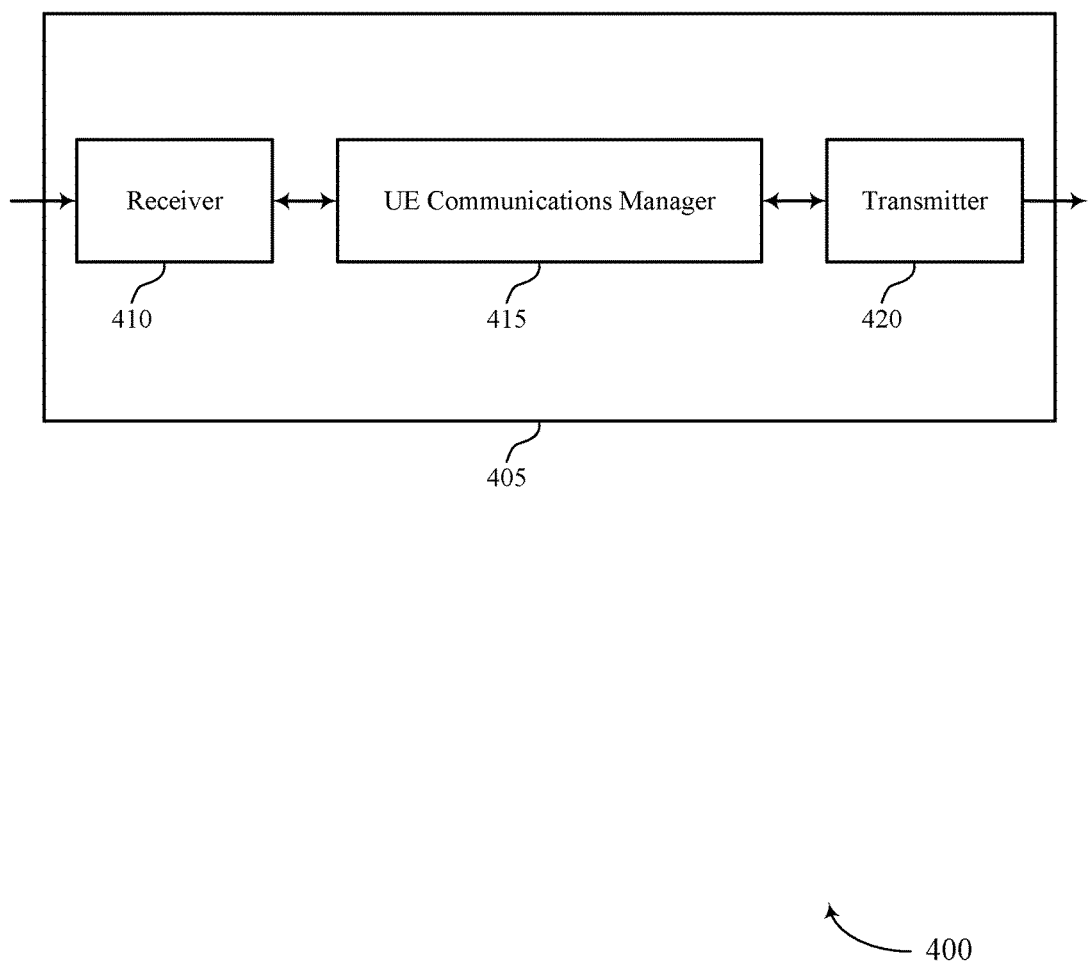
FIGS. 4 and 5 show block diagrams of devices that support techniques for multicast beam failure and recovery in accordance with aspects of the present disclosure.

FIG. 4 shows a block diagram 400 of a device 405 that supports techniques for multicast beam failure and recovery in accordance with aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for multicast beam failure and recovery, etc.). Information may be passed on to other components of the device 405. The receiver 410 may be an example of aspects of the transceiver 720 described with reference to FIG. 7. The receiver 410 may utilize a single antenna or a set of antennas.

The UE communications manager 415 may determine a unicast uplink grant including a set of uplink resources for a multicast beam recovery procedure based on a failure of a multicast beam associated with multicast communications between the UE and a base station, transmit, to the base station, a beam recovery request including an indication of the multicast beam, where the beam recovery request is transmitted based on the unicast uplink grant, receive, from the base station in response to the beam recovery request, a response message including an indication of a second uplink grant, an indication of a second beam for communications between the UE and the base station, or both, and transmit, to the base station, a first uplink transmission via the second uplink grant, the second beam, or both. The UE communications manager 415 may be an example of aspects of the UE communications manager 710 described herein.

The actions performed by the UE communications manager 415 as described herein may be implemented to realize one or more potential advantages. For example, the multicast beam recovery procedure used by a UE 115 may improve the efficiency and reliability by which a UE 115 is able to identify a failure of a multicast beam and/or recover the multicast beam. The techniques described herein may also reduce the time required for recovering a multicast beam. Additionally, by leveraging signaling used for unicast beam recovery to perform multicast beam recovery, the UE communications manager 415 may improve the restoration of multicast communications, thereby reducing potential retransmissions required for multicast beam recovery, alleviating network overhead, and reducing power consumption by the UE 115.

Based on leveraging signaling used for unicast beam recovery to perform multicast beam recovery, a processor of the UE 115 (e.g., a processor controlling the receiver 410, the UE communications manager 415, the transmitter 420, etc.) may reduce processing resources used for multicast beam recovery. For example, by improving the efficiency of a multicast beam recovery procedure, uplink and downlink transmissions (and retransmissions) associated with multicast beam recovery procedures may be reduced. Avoiding such transmissions and retransmissions associated with a multicast beam recovery procedure may correspondingly reducing a number of times the processor ramps up processing power and turns on processing units to handle uplink transmission and downlink reception.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
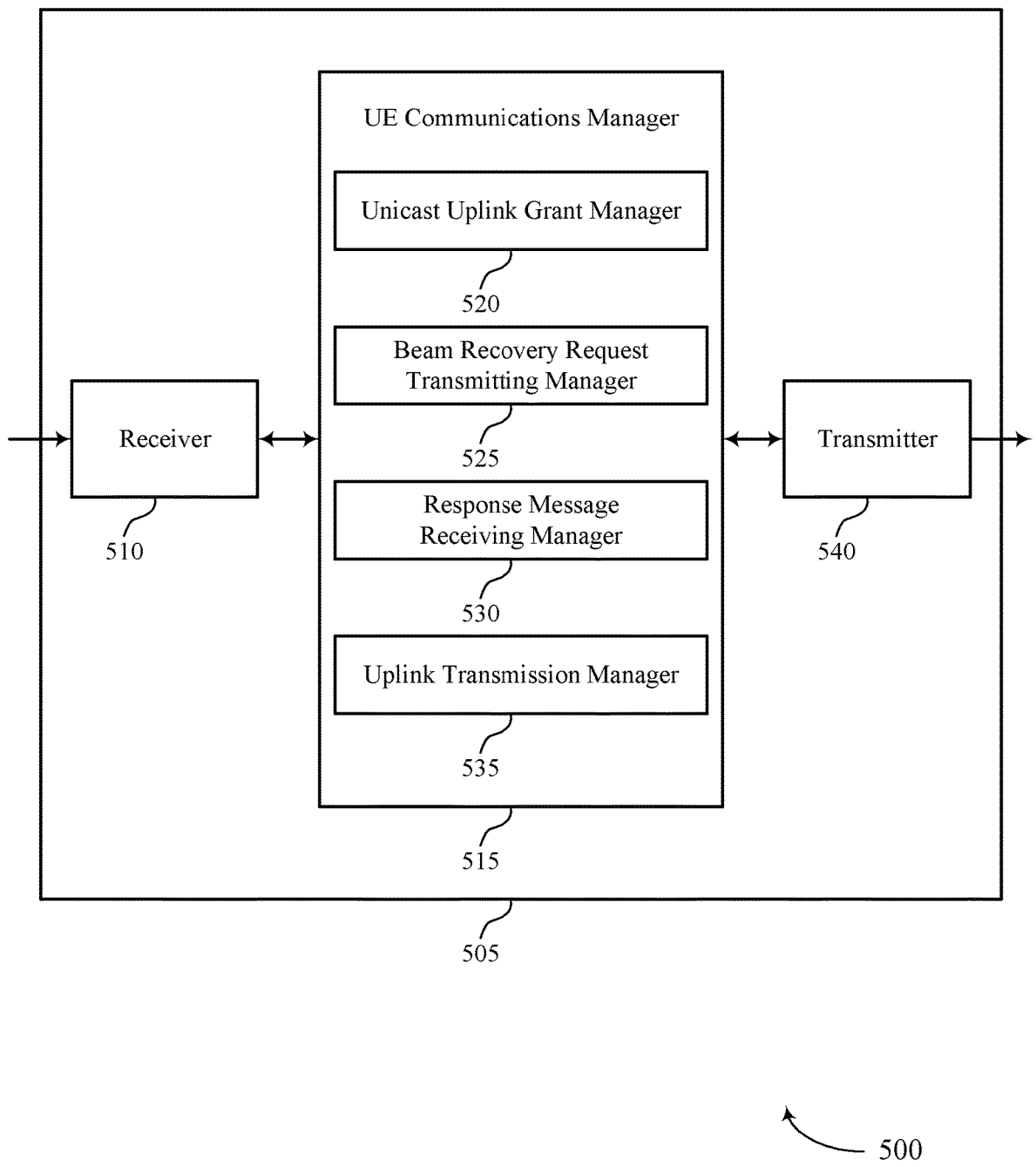

FIG. 5 shows a block diagram 500 of a device 505 that supports techniques for multicast beam failure and recovery in accordance with aspects of the present disclosure. The device 505 may be an example of aspects of a device 405, or a UE 115 as described herein. The device 505 may include a receiver 510, a UE communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to techniques for multicast beam failure and recovery, etc.). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include an unicast uplink grant manager 520, a beam recovery request transmitting manager 525, a response message receiving manager 530, and an uplink transmission manager 535. The UE communications manager 515 may be an example of aspects of the UE communications manager 710 described herein.

The unicast uplink grant manager 520 may determine a unicast uplink grant including a set of uplink resources for a multicast beam recovery procedure based on a failure of a multicast beam associated with multicast communications between the UE and a base station.

The beam recovery request transmitting manager 525 may transmit, to the base station, a beam recovery request including an indication of the multicast beam, where the beam recovery request is transmitted based on the unicast uplink grant.

The response message receiving manager 530 may receive, from the base station in response to the beam recovery request, a response message including an indication of a second uplink grant, an indication of a second beam for communications between the UE and the base station, or both.

The uplink transmission manager 535 may transmit, to the base station, a first uplink transmission via the second uplink grant, the second beam, or both.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
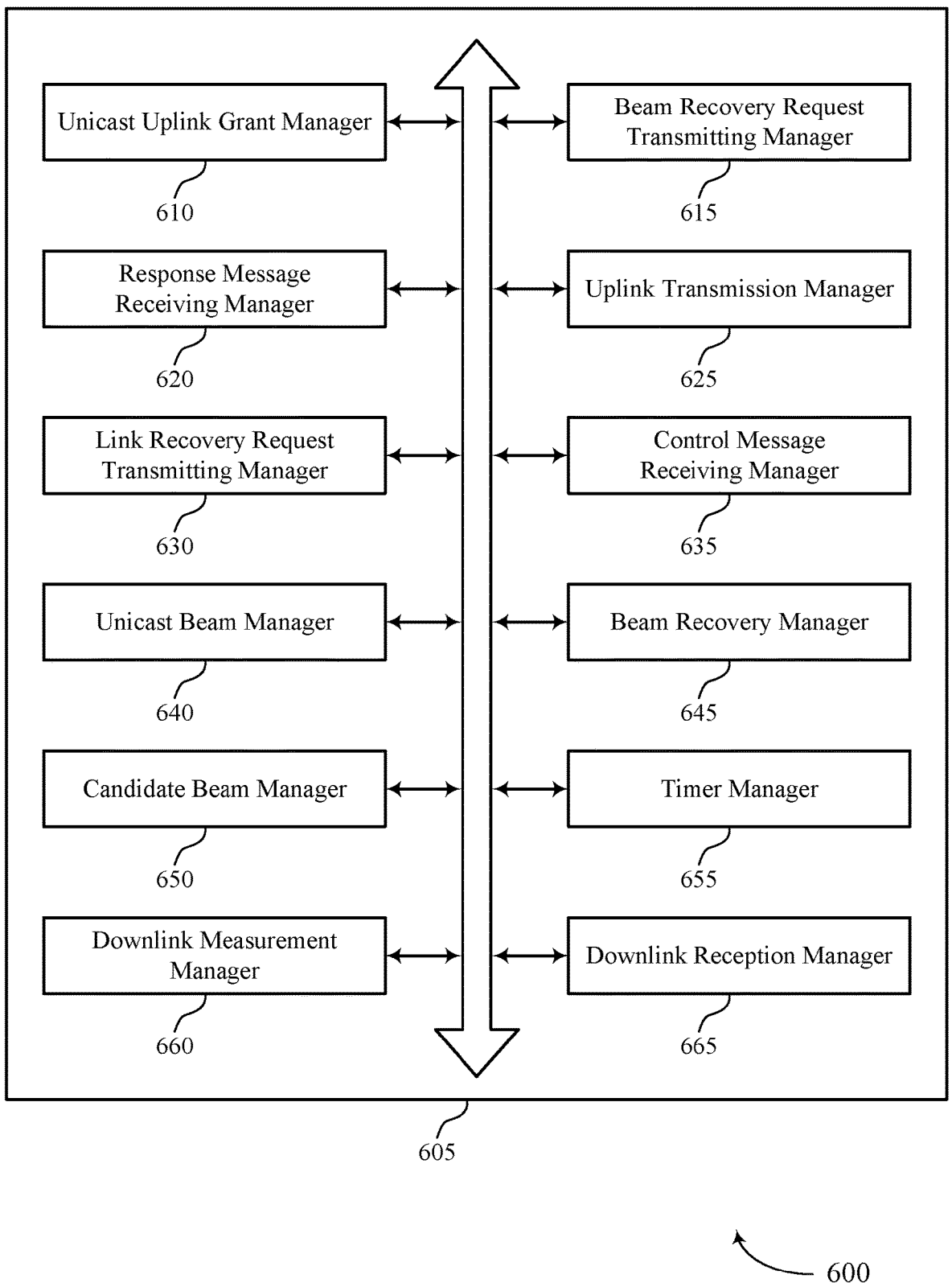
FIG. 6 shows a block diagram of a communications manager that supports techniques for multicast beam failure and recovery in accordance with aspects of the present disclosure.

FIG. 6 shows a block diagram 600 of a UE communications manager 605 that supports techniques for multicast beam failure and recovery in accordance with aspects of the present disclosure. The UE communications manager 605 may be an example of aspects of a UE communications manager 415, a UE communications manager 515, or a UE communications manager 710 described herein. The UE communications manager 605 may include an unicast uplink grant manager 610, a beam recovery request transmitting manager 615, a response message receiving manager 620, an uplink transmission manager 625, a link recovery request transmitting manager 630, a control message receiving manager 635, an unicast beam manager 640, a beam recovery manager 645, a candidate beam manager 650, a timer manager 655, a downlink measurement manager 660, and a downlink reception manager 665. Each of these modules may communicate, directly or indirectly, with one another (e.g., via one or more buses).

The unicast uplink grant manager 610 may determine a unicast uplink grant including a set of uplink resources for a multicast beam recovery procedure based on a failure of a multicast beam associated with multicast communications between the UE and a base station. In some examples, the unicast uplink grant manager 610 may receive, from the base station in response to the link recovery request, an indication of the unicast uplink grant.

The beam recovery request transmitting manager 615 may transmit, to the base station, a beam recovery request including an indication of the multicast beam, where the beam recovery request is transmitted based on the unicast uplink grant. In some examples, the beam recovery request transmitting manager 615 may transmit the beam recovery request via a physical random access channel based on determining the multicast beam recovery procedure has a higher priority than the unicast beam recovery procedure. In some examples, the beam recovery request transmitting manager 615 may transmit, to the base station via the beam recovery request, an indication of the one or more candidate beams. In some examples, the beam recovery request transmitting manager 615 may transmit, to the base station via the beam recovery request, an indication of the one or more beam parameters associated with the multicast beam, where the response message is based on the indication of the one or more beam parameters associated with the multicast beam. In some cases, the beam recovery request is transmitted via a MAC-CE message, a radio resource control message, or both.

The response message receiving manager 620 may receive, from the base station in response to the beam recovery request, a response message including an indication of a second uplink grant, an indication of a second beam for communications between the UE and the base station, or both. In some cases, the response message includes the indication of the second beam, where the first uplink transmission is transmitted to the base station via the second beam. In some cases, the second beam includes a second multicast beam for communications between the UE and the base station. In some cases, the second beam includes a unicast beam for communications between the UE and the base station.

The uplink transmission manager 625 may transmit, to the base station, a first uplink transmission via the second uplink grant, the second beam, or both. In some examples, the uplink transmission manager 625 may transmit, to the base station, the first uplink transmission via the second uplink grant. In some examples, the uplink transmission manager 625 may transmit, to the base station, a second uplink transmission according to the one or more candidate beams based on determining an indication to transmit uplink transmissions according to the one or more candidate beams.

The link recovery request transmitting manager 630 may transmit, to the base station, a link recovery request including an indication of the multicast beam recovery procedure based on the failure of the multicast beam. In some examples, the link recovery request transmitting manager 630 may transmit, to the base station via the link recovery request, a scheduling request for transmitting the beam recovery request, where the indication of the unicast uplink grant is received in response to the scheduling request.

The control message receiving manager 635 may receive, from the base station via a unicast beam, a control message indicating the unicast uplink grant including the set of uplink resources for the multicast beam recovery procedure, where determining the unicast uplink grant is based on receiving the control message.

The unicast beam manager 640 may determine a failure of a unicast beam associated with unicast communications between the UE and the base station. The beam recovery manager 645 may determine a priority between the multicast beam recovery procedure and a unicast beam recovery procedure associated with the unicast beam based on the failure of the unicast beam, where transmitting the beam recovery request is based on determining the priority. In some examples, the beam recovery manager 645 may determine the unicast beam recovery procedure has a higher priority than the multicast beam recovery procedure. In some examples, the beam recovery manager 645 may perform the unicast beam recovery procedure based on determining the unicast beam recovery procedure has a higher priority than the multicast beam recovery procedure, where the beam recovery request is transmitted based on performing the unicast beam recovery procedure. In some examples, the beam recovery manager 645 may determine the multicast beam recovery procedure has a higher priority than the unicast beam recovery procedure.

The candidate beam manager 650 may identify one or more candidate beams for communications between the UE and the base station.

The timer manager 655 may determine an expiration of a timer based on receiving the response message and a timer duration, where determining the indication to transmit uplink transmissions according to the one or more candidate beams is based on determining the expiration of the timer.

The downlink measurement manager 660 may perform one or more measurements on downlink transmissions received from the base station via the multicast beam. In some examples, the downlink measurement manager 660 may determine one or more beam parameters associated with the multicast beam based on the one or more measurements. In some examples, the downlink measurement manager 660 may compare the one or more beam parameters to one or more beam parameter thresholds, where identifying the failure of the multicast beam is based on the comparing. In some examples, the downlink measurement manager 660 may determine, based on the comparing, that at least one beam parameter of the one or more beam parameters satisfies at least one beam parameter threshold of the one or more beam parameter thresholds. In some cases, the one or more beam parameters include a reference signal received power value, a reference signal received quality value, a signal-to-noise ratio, a signal-to-interference-plus-noise ratio, or any combination thereof.

The downlink reception manager 665 may receive, from the base station, a retransmission of a first downlink transmission via the multicast beam based on the indication of the multicast beam. In some examples, the downlink reception manager 665 may receive, from the base station, a second downlink transmission via the second beam based on the indication of the second beam.

Figure 7:
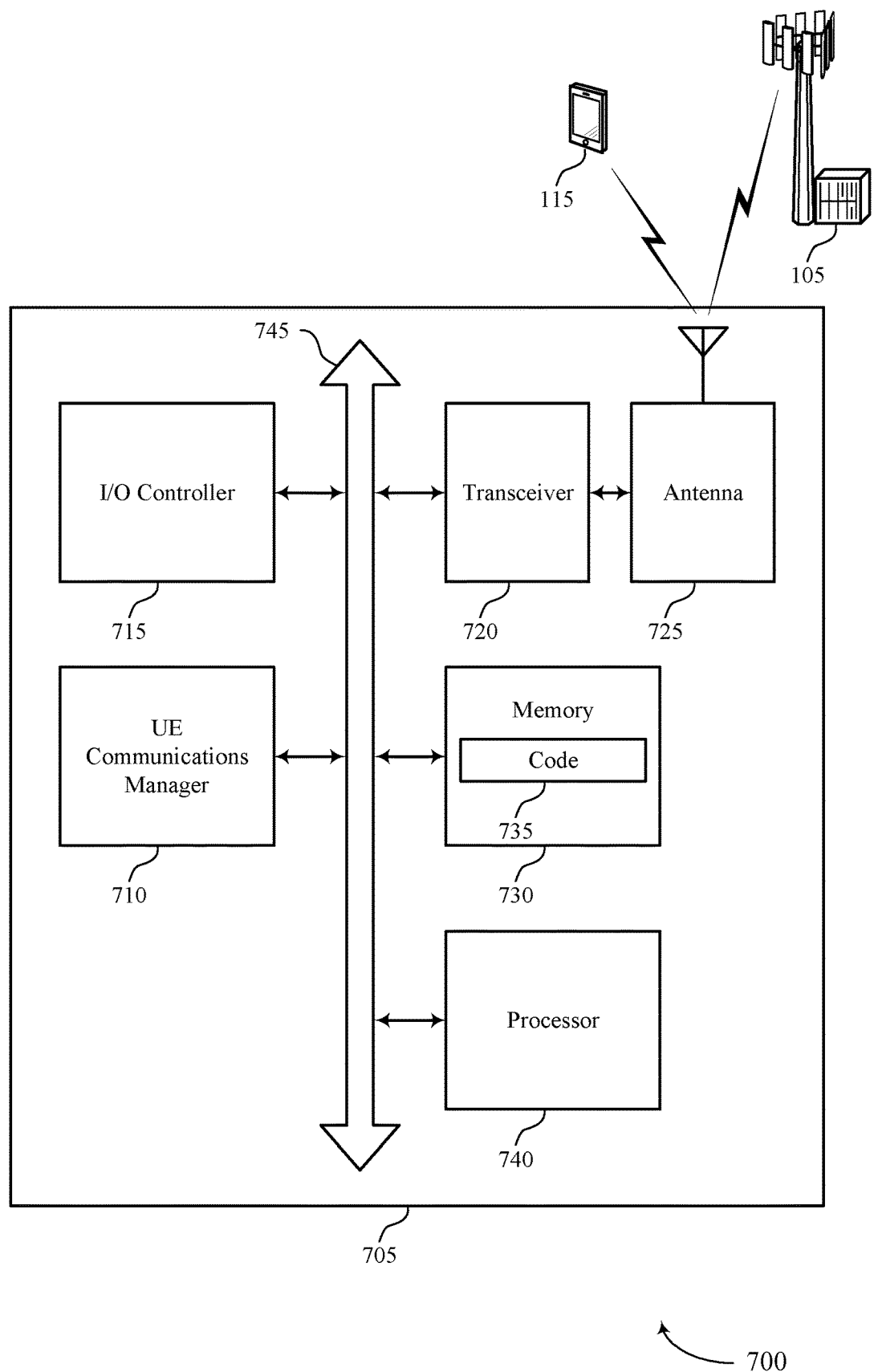
FIG. 7 shows a diagram of a system including a device that supports techniques for multicast beam failure and recovery in accordance with aspects of the present disclosure.

FIG. 7 shows a diagram of a system 700 including a device 705 that supports techniques for multicast beam failure and recovery in accordance with aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

The UE communications manager 710 may determine a unicast uplink grant including a set of uplink resources for a multicast beam recovery procedure based on a failure of a multicast beam associated with multicast communications between the UE and a base station, transmit, to the base station, a beam recovery request including an indication of the multicast beam, where the beam recovery request is transmitted based on the unicast uplink grant, receive, from the base station in response to the beam recovery request, a response message including an indication of a second uplink grant, an indication of a second beam for communications between the UE and the base station, or both, and transmit, to the base station, a first uplink transmission via the second uplink grant, the second beam, or both.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for multicast beam failure and recovery).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The actions performed by the device 705 as described herein may be implemented to realize one or more potential advantages. For example, the multicast beam recovery procedure used by a UE 115 (e.g., device 705) may improve the efficiency and reliability by which a UE 115 is able to identify a failure of a multicast beam and/or recover the multicast beam. By improving the efficiency of a multicast beam recovery procedure, uplink and downlink transmissions (and retransmissions) associated with multicast beam recovery procedures may be reduced, thereby reducing power consumption and improving battery life of the device 705. Moreover, by facilitating recovery of multicast beams, the device 705 may quickly restore data transfer at the device 705 (e.g., UE 115) via the multicast beam, thereby improving consumer experience.

Figure 8:
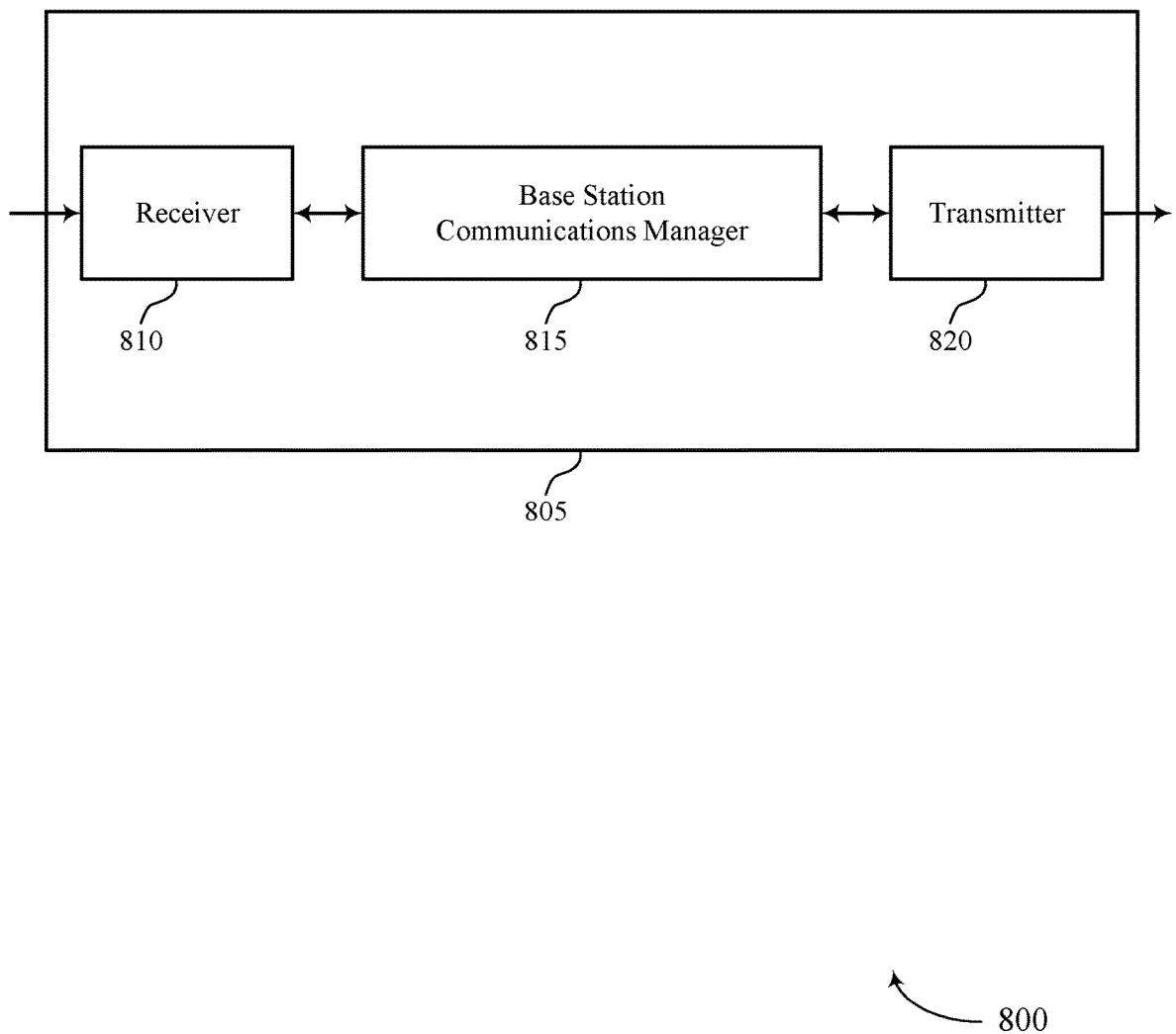
FIGS. 8 and 9 show block diagrams of devices that support techniques for multicast beam failure and recovery in accordance with aspects of the present disclosure.

FIG. 8 shows a block diagram 800 of a device 805 that supports techniques for multicast beam failure and recovery in accordance with aspects of the present disclosure. The device 805 may be an example of aspects of a base station 105 as described herein. The device 805 may include a receiver 810, a base station communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for multicast beam failure and recovery, etc.). Information may be passed on to other components of the device 805. The receiver 810 may be an example of aspects of the transceiver 1120 described with reference to FIG. 11. The receiver 810 may utilize a single antenna or a set of antennas.

The base station communications manager 815 may determine a unicast uplink grant including a set of uplink resources for a multicast beam recovery procedure associated with a multicast beam configured for multicast communications between a UE and the base station, receive, from the UE, a beam recovery request including an indication of the multicast beam, where the beam recovery request is received based on the unicast uplink grant, transmit, to the UE in response to the beam recovery request, a response message including an indication of a second uplink grant, an indication of a second beam for communications between the UE and the base station, or both, and receive, from the UE, a first uplink transmission via the second uplink grant, the second beam, or both. The base station communications manager 815 may be an example of aspects of the base station communications manager 1110 described herein.

The actions performed by the base station communications manager 815 as described herein may be implemented to realize one or more potential advantages. For example, the multicast beam recovery procedure used by a base station 105 may improve the efficiency and reliability by which a UE 115 is able to identify a failure of a multicast beam and/or recover the multicast beam. The techniques described herein may also reduce the time required for recovering a multicast beam. Additionally, by leveraging signaling used for unicast beam recovery to perform multicast beam recovery, the base station communications manager 815 may improve the restoration of multicast communications, thereby reducing potential retransmissions required for multicast beam recovery, alleviating network overhead, and reducing power consumption by the base station 105.

Based on leveraging signaling used for unicast beam recovery to perform multicast beam recovery, a processor of the base station 105 (e.g., a processor controlling the receiver 810, the base station communications manager 815, the transmitter 820, etc.) may reduce processing resources used for multicast beam recovery. For example, by improving the efficiency of a multicast beam recovery procedure, uplink and downlink transmissions (and retransmissions) associated with multicast beam recovery procedures may be reduced. Avoiding such transmissions and retransmissions associated with a multicast beam recovery procedure may correspondingly reducing a number of times the processor ramps up processing power and turns on processing units to handle uplink transmission and downlink reception.

The base station communications manager 815, or its sub-components, may be implemented in hardware, code (e.g., software or firmware) executed by a processor, or any combination thereof. If implemented in code executed by a processor, the functions of the base station communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 815, or its sub-components, may be physically located at various positions, including being distributed such that portions of functions are implemented at different physical locations by one or more physical components. In some examples, the base station communications manager 815, or its sub-components, may be a separate and distinct component in accordance with various aspects of the present disclosure. In some examples, the base station communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
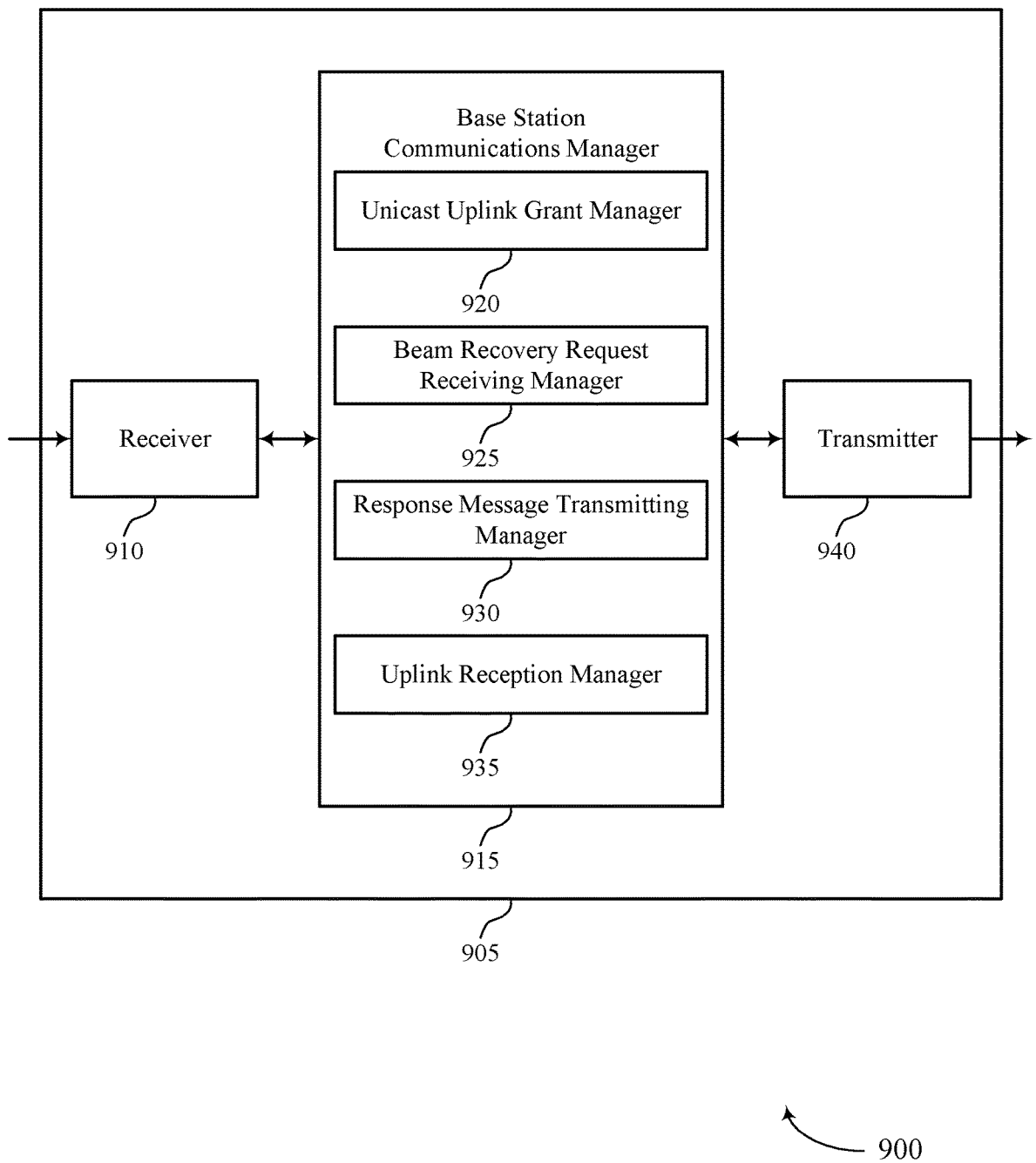

FIG. 9 shows a block diagram 900 of a device 905 that supports techniques for multicast beam failure and recovery in accordance with aspects of the present disclosure. The device 905 may be an example of aspects of a device 805, or a base station 105 as described herein. The device 905 may include a receiver 910, a base station communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to techniques for multicast beam failure and recovery, etc.). Information may be passed on to other components of the device 905. The receiver 910 may be an example of aspects of the transceiver 1120 described with reference to FIG. 11. The receiver 910 may utilize a single antenna or a set of antennas.

The base station communications manager 915 may be an example of aspects of the base station communications manager 815 as described herein. The base station communications manager 915 may include an unicast uplink grant manager 920, a beam recovery request receiving manager 925, a response message transmitting manager 930, and an uplink reception manager 935. The base station communications manager 915 may be an example of aspects of the base station communications manager 1110 described herein.

The unicast uplink grant manager 920 may determine a unicast uplink grant including a set of uplink resources for a multicast beam recovery procedure associated with a multicast beam configured for multicast communications between a UE and the base station.

The beam recovery request receiving manager 925 may receive, from the UE, a beam recovery request including an indication of the multicast beam, where the beam recovery request is received based on the unicast uplink grant.

The response message transmitting manager 930 may transmit, to the UE in response to the beam recovery request, a response message including an indication of a second uplink grant, an indication of a second beam for communications between the UE and the base station, or both.

The uplink reception manager 935 may receive, from the UE, a first uplink transmission via the second uplink grant, the second beam, or both.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
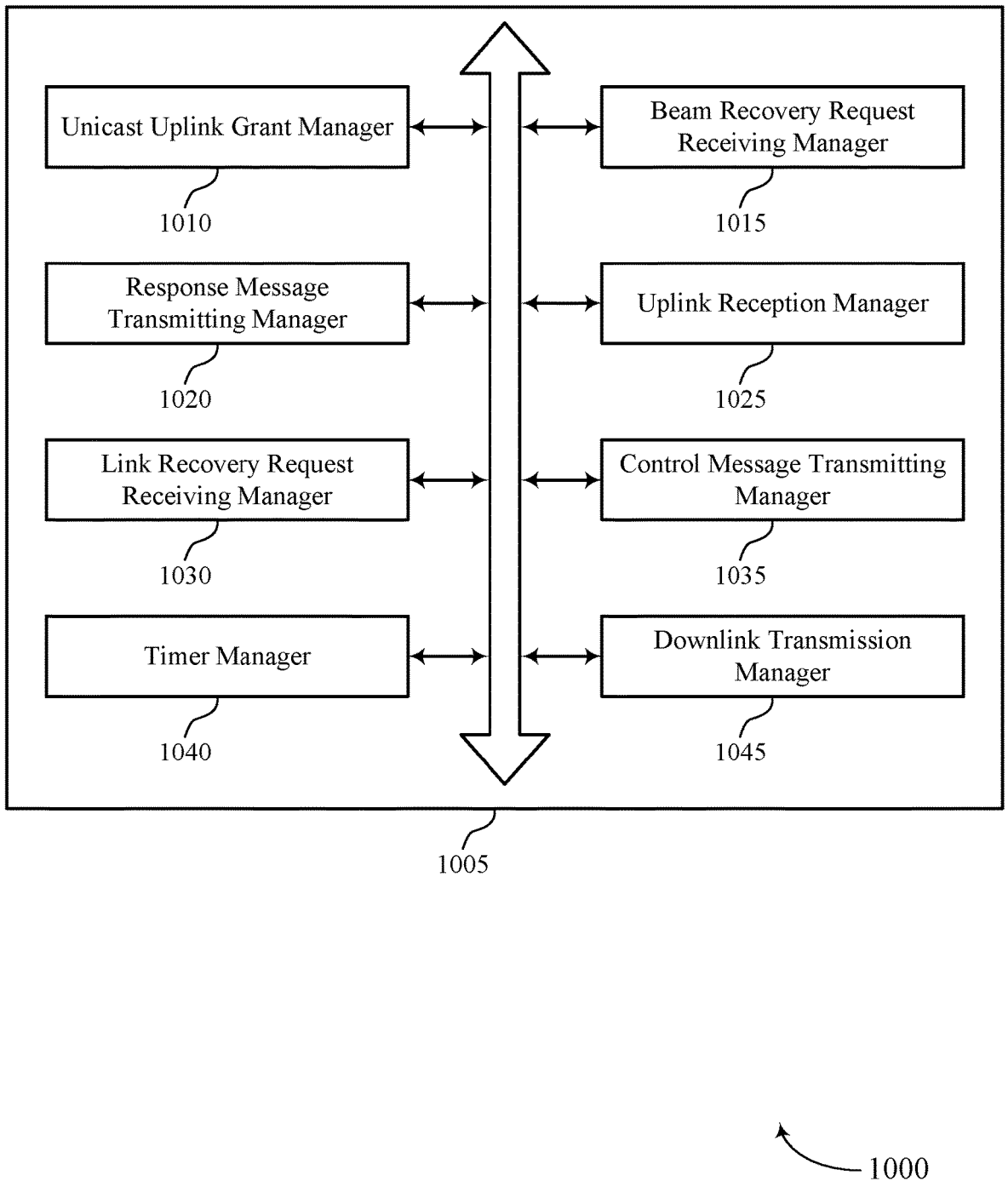
FIG. 10 shows a block diagram of a communications manager that supports techniques for multicast beam failure and recovery in accordance with aspects of the present disclosure.

FIG. 10 shows a block diagram 1000 of a base station communications manager 1005 that supports techniques for multicast beam failure and recovery in accordance with aspects of the present disclosure. The base station communications manager 1005 may be an example of aspects of a base station communications manager 815, a base station communications manager 915, or a base station communications manager 1110 described herein. The base station communications manager 1005 may include an unicast uplink grant manager 1010, a beam recovery request receiving manager 1015, a response message transmitting manager 1020, an uplink reception manager 1025, a link recovery request receiving manager 1030, a control message transmitting manager 1035, a timer manager 1040, and a downlink transmission manager 1045. Each of these modules may communicate, directly or indirectly, with one another (e.g., via one or more buses).

The unicast uplink grant manager 1010 may determine a unicast uplink grant including a set of uplink resources for a multicast beam recovery procedure associated with a multicast beam configured for multicast communications between a UE and the base station. In some examples, the unicast uplink grant manager 1010 may transmit, to the UE in response to the link recovery request, an indication of the unicast uplink grant.

The beam recovery request receiving manager 1015 may receive, from the UE, a beam recovery request including an indication of the multicast beam, where the beam recovery request is received based on the unicast uplink grant. In some examples, the beam recovery request receiving manager 1015 may receive, from the UE via the beam recovery request, an indication of one or more candidate beams for communications between the UE and the base station. In some examples, the beam recovery request receiving manager 1015 may receive, from the UE via the beam recovery request, an indication of one or more beam parameters associated with the multicast beam, where the response message is based on the indication of the one or more beam parameters associated with the multicast beam. In some cases, the one or more beam parameters include a reference signal received power value, a reference signal received quality value, a signal-to-noise ratio, a signal-to-interference-plus-noise ratio, or any combination thereof. In some cases, the beam recovery request is received via a MAC-CE message, a radio resource control message, or both.

The response message transmitting manager 1020 may transmit, to the UE in response to the beam recovery request, a response message including an indication of a second uplink grant, an indication of a second beam for communications between the UE and the base station, or both. In some cases, the response message includes the indication of the second uplink grant, where the first uplink transmission is received from the UE via the second beam. In some cases, the second beam includes a second multicast beam for communications between the UE and the base station. In some cases, the second beam includes a unicast beam for communications between the UE and the base station.

The uplink reception manager 1025 may receive, from the UE, a first uplink transmission via the second uplink grant, the second beam, or both. In some examples, the uplink reception manager 1025 may receive, from the UE, the first uplink transmission via the second uplink grant. In some examples, the uplink reception manager 1025 may receive, from the UE, a second uplink transmission according to the one or more candidate beams based on determining an indication to receive uplink transmissions according to the one or more candidate beams.

The link recovery request receiving manager 1030 may receive, from the UE, a link recovery request including an indication of the multicast beam recovery procedure based on a failure of the multicast beam. In some examples, the link recovery request receiving manager 1030 may receive, from the UE via the link recovery request, a scheduling request for transmitting the beam recovery request, where the indication of the unicast uplink grant is transmitted in response to the scheduling request.

The control message transmitting manager 1035 may transmit, to the UE via a unicast beam, a control message indicating the unicast uplink grant including the set of uplink resources for the multicast beam recovery procedure.

The timer manager 1040 may determine an expiration of a timer based on transmitting the response message and a timer duration, where determining the indication to receive uplink transmissions according to the one or more candidate beams is based on determining the expiration of the timer.

The downlink transmission manager 1045 may transmit, to the UE, a retransmission of a first downlink transmission via the multicast beam based on the indication of the multicast beam. In some examples, the downlink transmission manager 1045 may transmit, to the UE, a second downlink transmission via the second beam based on the indication of the second beam.

Figure 11:
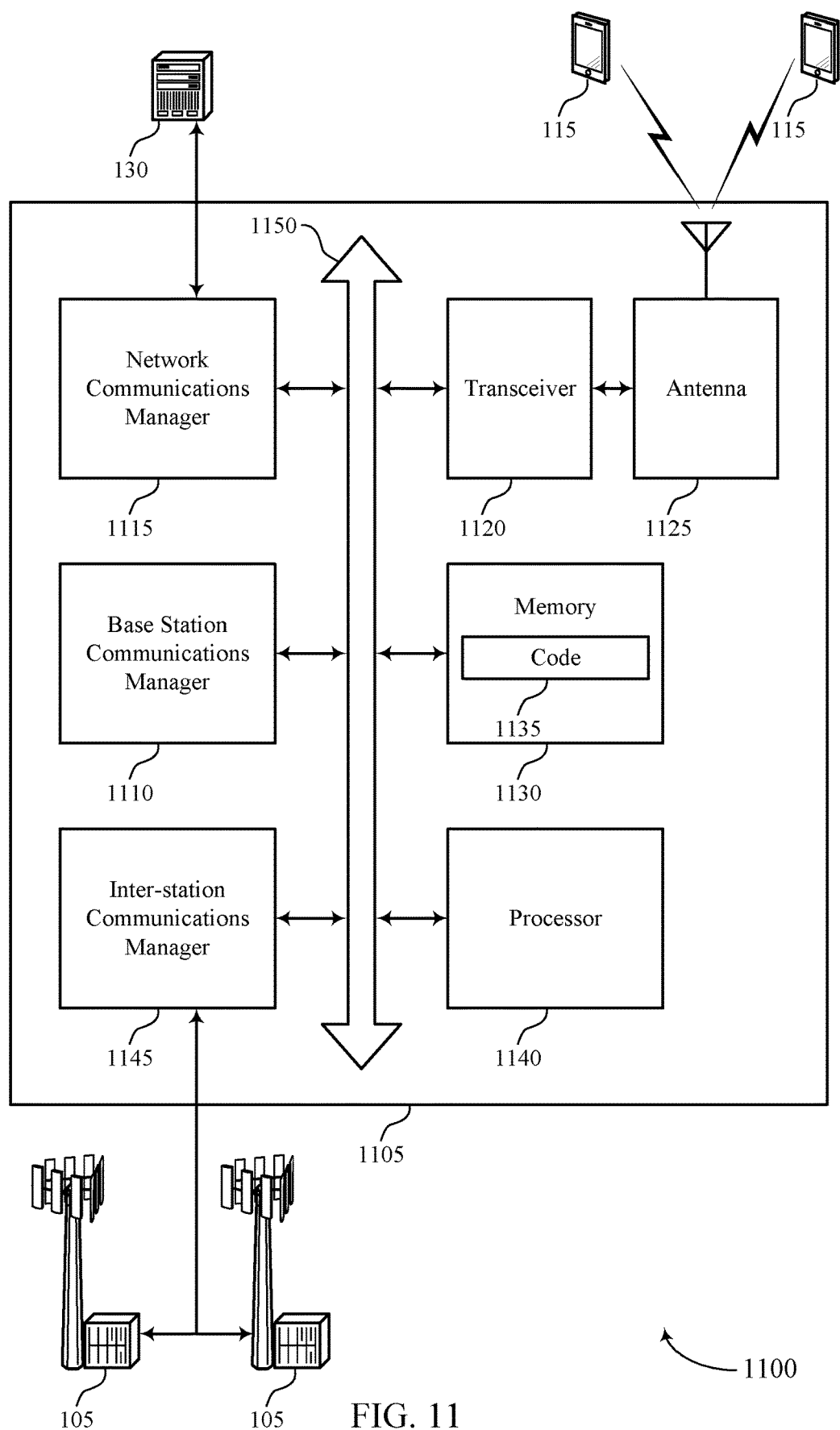
FIG. 11 shows a diagram of a system including a device that supports techniques for multicast beam failure and recovery in accordance with aspects of the present disclosure.

FIG. 11 shows a diagram of a system 1100 including a device 1105 that supports techniques for multicast beam failure and recovery in accordance with aspects of the present disclosure. The device 1105 may be an example of or include the components of device 805, device 905, or a base station 105 as described herein. The device 1105 may include components for bi-directional voice and data communications including components for transmitting and receiving communications, including a base station communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The base station communications manager 1110 may determine a unicast uplink grant including a set of uplink resources for a multicast beam recovery procedure associated with a multicast beam configured for multicast communications between a UE and the base station, receive, from the UE, a beam recovery request including an indication of the multicast beam, where the beam recovery request is received based on the unicast uplink grant, transmit, to the UE in response to the beam recovery request, a response message including an indication of a second uplink grant, an indication of a second beam for communications between the UE and the base station, or both, and receive, from the UE, a first uplink transmission via the second uplink grant, the second beam, or both.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting techniques for multicast beam failure and recovery).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
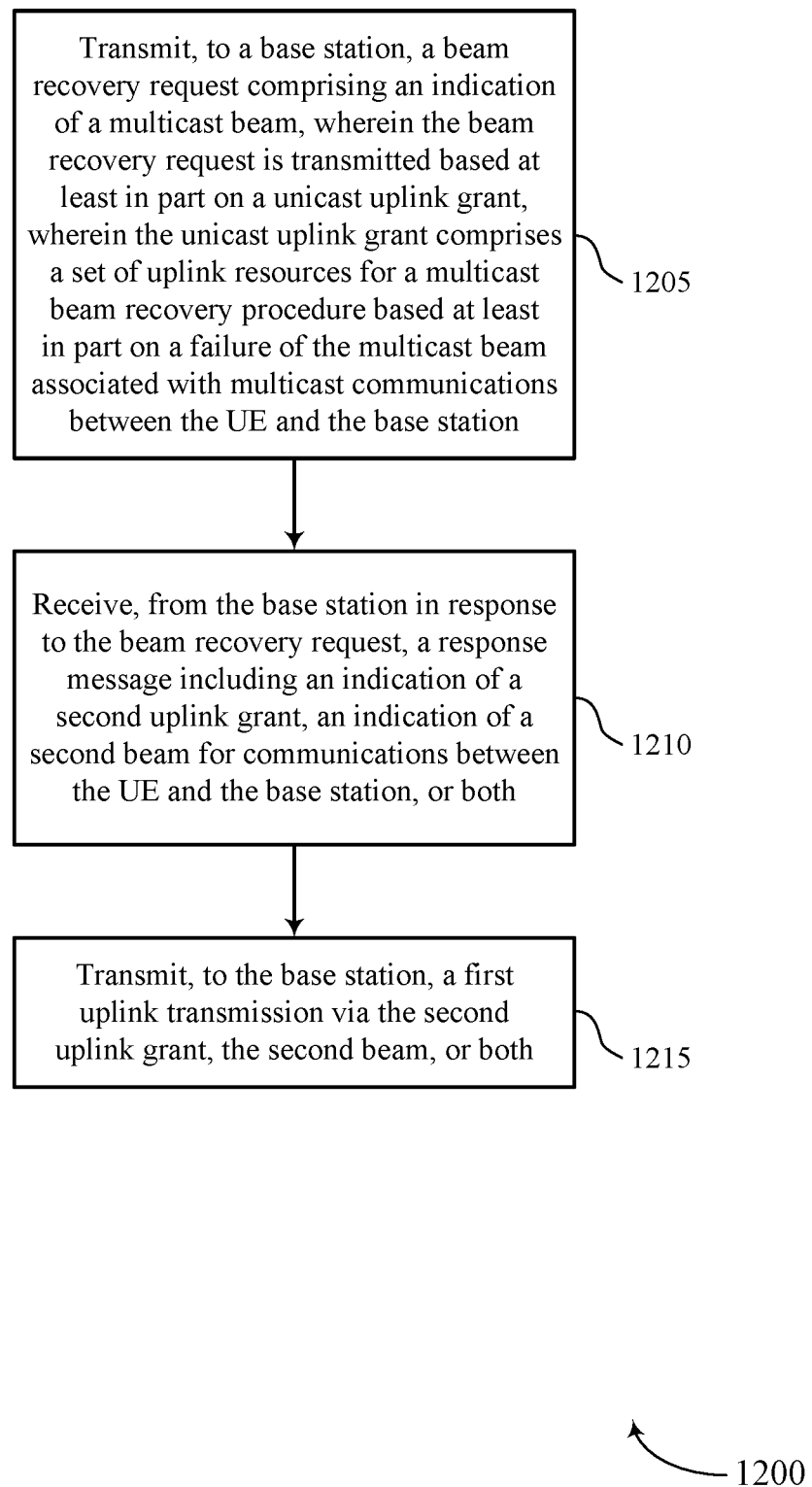
FIGS. 12 through 15 show flowcharts illustrating methods that support techniques for multicast beam failure and recovery in accordance with aspects of the present disclosure.

FIG. 12 shows a flowchart illustrating a method 1200 that supports techniques for multicast beam failure and recovery in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1205, the UE may transmit, to a base station, a beam recovery request comprising an indication of a multicast beam, wherein the beam recovery request is transmitted based at least in part on a unicast uplink grant, wherein the unicast uplink grant comprises a set of uplink resources for a multicast beam recovery procedure based at least in part on a failure of the multicast beam associated with multicast communications between the UE and the base station. The operations of 1205 may be performed according to the methods described herein. In some examples, aspects of the operations of 1205 may be performed by an unicast uplink grant manager as described with reference to FIGS. 4 through 7.

At 1210, the UE may receive, from the base station in response to the beam recovery request, a response message including an indication of a second uplink grant, an indication of a second beam for communications between the UE and the base station, or both. The operations of 1210 may be performed according to the methods described herein. In some examples, aspects of the operations of 1210 may be performed by a beam recovery request transmitting manager as described with reference to FIGS. 4 through 7.

At 1215, the UE may transmit, to the base station, a first uplink transmission via the second uplink grant, the second beam, or both. The operations of 1220 may be performed according to the methods described herein. The operations of 1215 may be performed according to the methods described herein. In some examples, aspects of the operations of 1215 may be performed by a response message receiving manager as described with reference to FIGS. 4 through 7.

Figure 13:
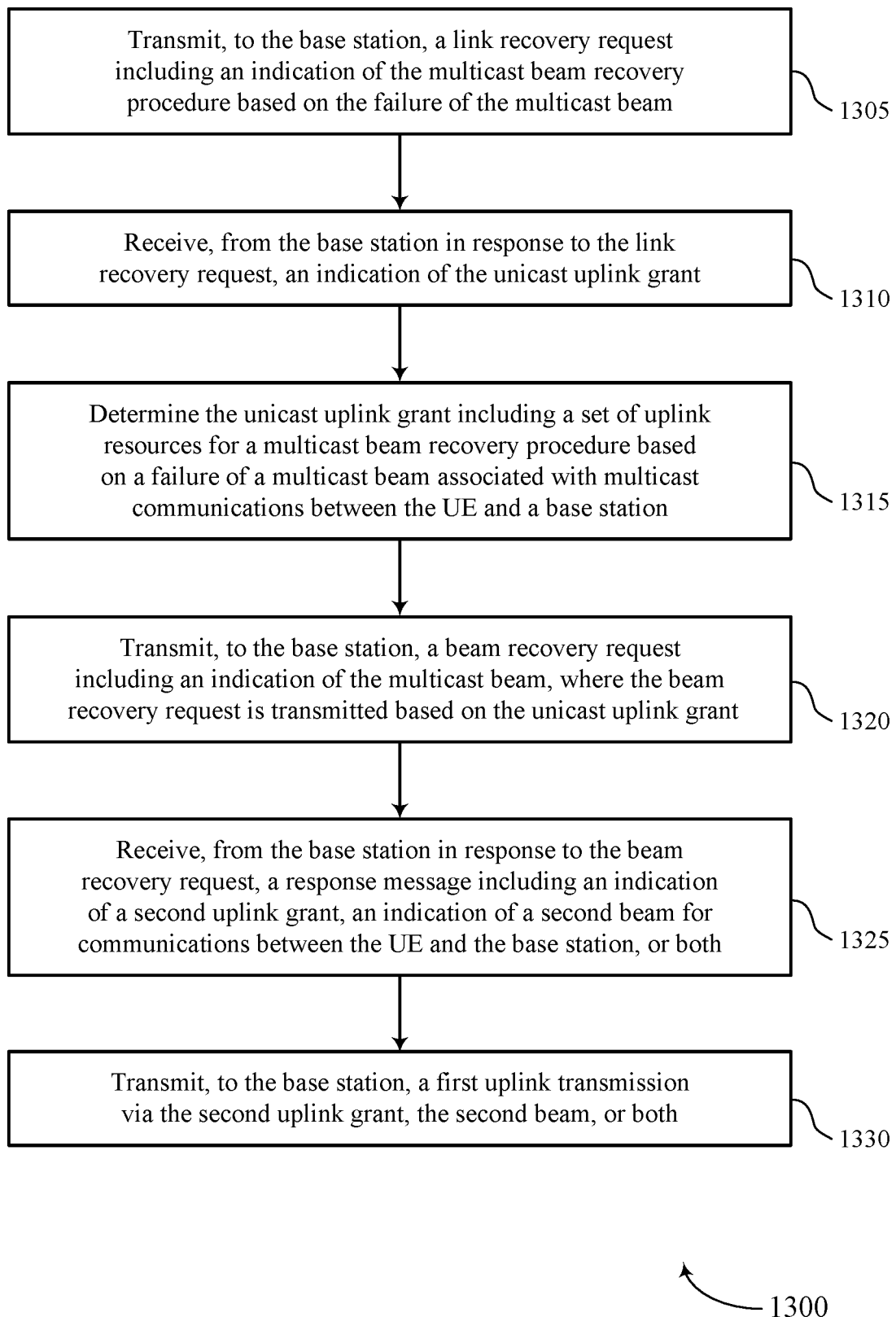

FIG. 13 shows a flowchart illustrating a method 1300 that supports techniques for multicast beam failure and recovery in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1305, the UE may transmit, to the base station, a link recovery request including an indication of the multicast beam recovery procedure based on the failure of the multicast beam. The operations of 1305 may be performed according to the methods described herein. In some examples, aspects of the operations of 1305 may be performed by a link recovery request transmitting manager as described with reference to FIGS. 4 through 7.

At 1310, the UE may receive, from the base station in response to the link recovery request, an indication of the unicast uplink grant. The operations of 1310 may be performed according to the methods described herein. In some examples, aspects of the operations of 1310 may be performed by an unicast uplink grant manager as described with reference to FIGS. 4 through 7.

At 1315, the UE may determine the unicast uplink grant including a set of uplink resources for a multicast beam recovery procedure based on a failure of a multicast beam associated with multicast communications between the UE and a base station. The operations of 1315 may be performed according to the methods described herein. In some examples, aspects of the operations of 1315 may be performed by an unicast uplink grant manager as described with reference to FIGS. 4 through 7.

At 1320, the UE may transmit, to the base station, a beam recovery request including an indication of the multicast beam, where the beam recovery request is transmitted based on the unicast uplink grant. The operations of 1320 may be performed according to the methods described herein. In some examples, aspects of the operations of 1320 may be performed by a beam recovery request transmitting manager as described with reference to FIGS. 4 through 7.

At 1325, the UE may receive, from the base station in response to the beam recovery request, a response message including an indication of a second uplink grant, an indication of a second beam for communications between the UE and the base station, or both. The operations of 1325 may be performed according to the methods described herein. In some examples, aspects of the operations of 1325 may be performed by a response message receiving manager as described with reference to FIGS. 4 through 7.

At 1330, the UE may transmit, to the base station, a first uplink transmission via the second uplink grant, the second beam, or both. The operations of 1330 may be performed according to the methods described herein. In some examples, aspects of the operations of 1330 may be performed by an uplink transmission manager as described with reference to FIGS. 4 through 7.

Figure 14:
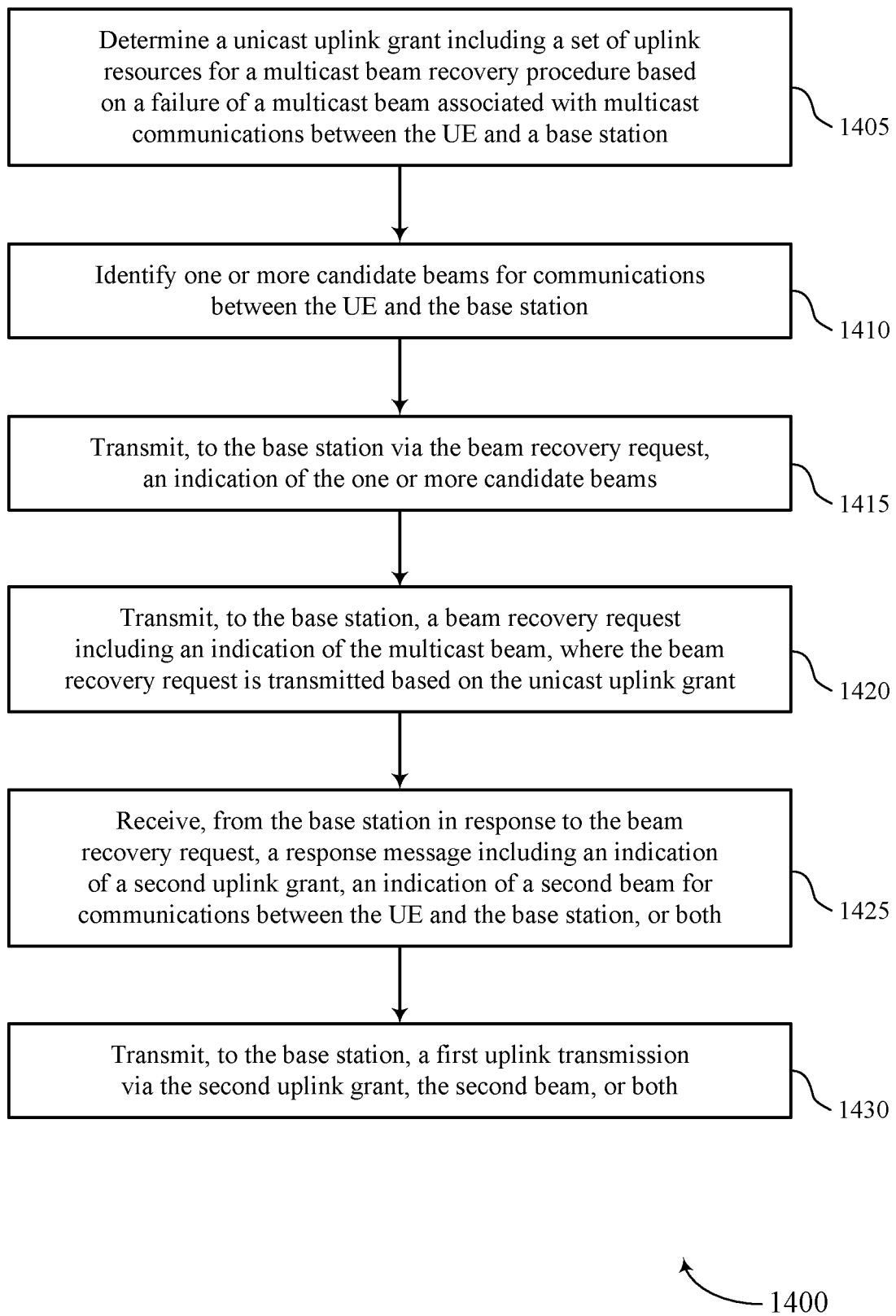

FIG. 14 shows a flowchart illustrating a method 1400 that supports techniques for multicast beam failure and recovery in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally, or alternatively, a UE may perform aspects of the functions described below using special-purpose hardware.

At 1405, the UE may determine a unicast uplink grant including a set of uplink resources for a multicast beam recovery procedure based on a failure of a multicast beam associated with multicast communications between the UE and a base station. The operations of 1405 may be performed according to the methods described herein. In some examples, aspects of the operations of 1405 may be performed by an unicast uplink grant manager as described with reference to FIGS. 4 through 7.

At 1410, the UE may identify one or more candidate beams for communications between the UE and the base station. The operations of 1410 may be performed according to the methods described herein. In some examples, aspects of the operations of 1410 may be performed by a candidate beam manager as described with reference to FIGS. 4 through 7.

At 1415, the UE may transmit, to the base station via the beam recovery request, an indication of the one or more candidate beams. The operations of 1415 may be performed according to the methods described herein. In some examples, aspects of the operations of 1415 may be performed by a beam recovery request transmitting manager as described with reference to FIGS. 4 through 7.

At 1420, the UE may transmit, to the base station, a beam recovery request including an indication of the multicast beam, where the beam recovery request is transmitted based on the unicast uplink grant. The operations of 1420 may be performed according to the methods described herein. In some examples, aspects of the operations of 1420 may be performed by a beam recovery request transmitting manager as described with reference to FIGS. 4 through 7.

At 1425, the UE may receive, from the base station in response to the beam recovery request, a response message including an indication of a second uplink grant, an indication of a second beam for communications between the UE and the base station, or both. The operations of 1425 may be performed according to the methods described herein. In some examples, aspects of the operations of 1425 may be performed by a response message receiving manager as described with reference to FIGS. 4 through 7.

At 1430, the UE may transmit, to the base station, a first uplink transmission via the second uplink grant, the second beam, or both. The operations of 1430 may be performed according to the methods described herein. In some examples, aspects of the operations of 1430 may be performed by an uplink transmission manager as described with reference to FIGS. 4 through 7.

Figure 15:
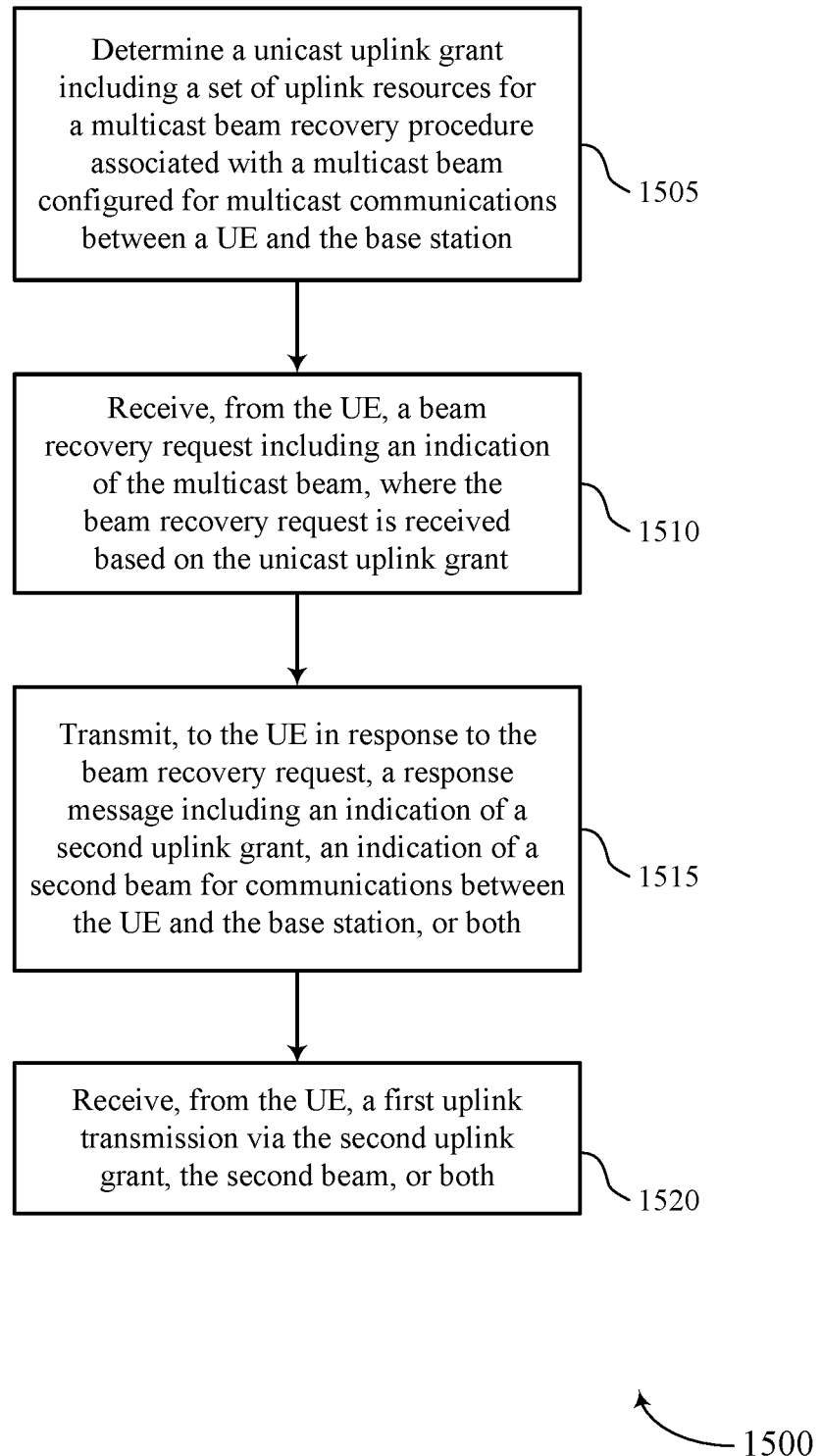

FIG. 15 shows a flowchart illustrating a method 1500 that supports techniques for multicast beam failure and recovery in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally, or alternatively, a base station may perform aspects of the functions described below using special-purpose hardware.

At 1505, the base station may determine a unicast uplink grant including a set of uplink resources for a multicast beam recovery procedure associated with a multicast beam configured for multicast communications between a UE and the base station. The operations of 1505 may be performed according to the methods described herein. In some examples, aspects of the operations of 1505 may be performed by an unicast uplink grant manager as described with reference to FIGS. 8 through 11.

At 1510, the base station may receive, from the UE, a beam recovery request including an indication of the multicast beam, where the beam recovery request is received based on the unicast uplink grant. The operations of 1510 may be performed according to the methods described herein. In some examples, aspects of the operations of 1510 may be performed by a beam recovery request receiving manager as described with reference to FIGS. 8 through 11.

At 1515, the base station may transmit, to the UE in response to the beam recovery request, a response message including an indication of a second uplink grant, an indication of a second beam for communications between the UE and the base station, or both. The operations of 1515 may be performed according to the methods described herein. In some examples, aspects of the operations of 1515 may be performed by a response message transmitting manager as described with reference to FIGS. 8 through 11.

At 1520, the base station may receive, from the UE, a first uplink transmission via the second uplink grant, the second beam, or both. The operations of 1520 may be performed according to the methods described herein. In some examples, aspects of the operations of 1520 may be performed by an uplink reception manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Aspect 1: A method for wireless communication at a UE, comprising: transmitting, to a base station, a beam recovery request comprising an indication of a multicast beam, wherein the beam recovery request is transmitted based at least in part on a unicast uplink grant, wherein the unicast uplink grant comprises a set of uplink resources for a multicast beam recovery procedure based at least in part on a failure of the multicast beam associated with multicast communications between the UE and the base station; receiving, from the base station in response to the beam recovery request, a response message comprising an indication of a second uplink grant, an indication of a second beam for communications between the UE and the base station, or both; and transmitting, to the base station, a first uplink transmission via the second uplink grant, the second beam, or both.

Aspect 2: The method of aspect 1, further comprising: transmitting, to the base station, a link recovery request comprising an indication of the multicast beam recovery procedure based at least in part on the failure of the multicast beam; and receiving, from the base station in response to the link recovery request, an indication of the unicast uplink grant.

Aspect 3: The method of aspect 2, further comprising: receiving, from the base station via a unicast beam, a control message indicating the unicast uplink grant comprising the set of uplink resources for the multicast beam recovery procedure, wherein determining the unicast uplink grant is based at least in part on receiving the control message.

Aspect 4: The method of any of aspects 2 through 3, further comprising: determining a failure of a unicast beam associated with unicast communications between the UE and the base station; and determining a priority between the multicast beam recovery procedure and a unicast beam recovery procedure associated with the unicast beam based at least in part on the failure of the unicast beam, wherein transmitting the beam recovery request is based at least in part on determining the priority.

Aspect 5: The method of aspect 4, further comprising: determining the unicast beam recovery procedure has a higher priority than the multicast beam recovery procedure; and performing the unicast beam recovery procedure based at least in part on determining the unicast beam recovery procedure has higher priority than the multicast beam recovery procedure, wherein the beam recovery request is transmitted based at least in part on performing the unicast beam recovery procedure.

Aspect 6: The method of any of aspects 4, further comprising: transmitting the beam recovery request via a physical random access channel based at least in part on the multicast beam recovery procedure having a higher priority than the unicast beam recovery procedure.

Aspect 7: The method of any of aspects 2 through 6, further comprising: transmitting, to the base station via the link recovery request, a scheduling request for transmitting the beam recovery request, wherein the indication of the unicast uplink grant is received in response to the scheduling request.

Aspect 8: The method of any of aspects 1 through 7, further comprising: transmitting, to the base station via the beam recovery request, an indication of one or more candidate beams for communications between the UE and the base station.

Aspect 9: The method of aspect 8, wherein the response message comprises the indication of the second uplink grant, the method further comprising: transmitting, to the base station, the first uplink transmission via the second uplink grant; and transmitting, to the base station, a second uplink transmission according to the one or more candidate beams based at least in part on determining an indication to transmit uplink transmissions according to the one or more candidate beams.

Aspect 10: The method of aspect 9, further comprising: determining an expiration of a timer based at least in part on receiving the response message and a timer duration, wherein determining the indication to transmit uplink transmissions according to the one or more candidate beams is based at least in part on determining the expiration of the timer.

Aspect 11: The method of any of aspects 8 through 10, wherein the response message comprises the indication of the second beam, the first uplink transmission is transmitted to the base station via the second beam.

Aspect 12: The method of any of aspects 1 through 11, further comprising: performing one or more measurements on downlink transmissions received from the base station via the multicast beam; determining one or more beam parameters associated with the multicast beam based at least in part on the one or more measurements; and comparing the one or more beam parameters to one or more beam parameter thresholds, wherein identifying the failure of the multicast beam is based at least in part on the comparing.

Aspect 13: The method of aspect 12, wherein identifying the failure of the multicast beam comprises: determining, based at least in part on the comparing, that at least one beam parameter of the one or more beam parameters satisfies at least one beam parameter threshold of the one or more beam parameter thresholds.

Aspect 14: The method of any of aspects 12 through 13, wherein the one or more beam parameters comprise a reference signal received power value, a reference signal received quality value, a signal-to-noise ratio, a signal-to-interference-plus-noise ratio, or any combination thereof.

Aspect 15: The method of any of aspects 12 through 14, further comprising: transmitting, to the base station via the beam recovery request, an indication of the one or more beam parameters associated with the multicast beam, wherein the response message is based at least in part on the indication of the one or more beam parameters associated with the multicast beam.

Aspect 16: The method of any of aspects 1 through 15, wherein the beam recovery request is transmitted via a MAC-CE message, a radio resource control message, or both.

Aspect 17: The method of any of aspects 1 through 16, wherein the second beam comprises a second multicast beam for communications between the UE and the base station.

Aspect 18: The method of any of aspects 1 through 16, wherein the second beam comprises a unicast beam for communications between the UE and the base station.

Aspect 19: The method of any of aspects 1 through 18, wherein the response message comprises an indication of the second beam and an indication of the multicast beam, the method further comprising: receiving, from the base station, a retransmission of a first downlink transmission via the multicast beam based at least in part on the indication of the multicast beam; and receiving, from the base station, a second downlink transmission via the second beam based at least in part on the indication of the second beam.

Aspect 20: A method for wireless communication at a base station, comprising: determining a unicast uplink grant comprising a set of uplink resources for a multicast beam recovery procedure associated with a multicast beam configured for multicast communications between a UE and the base station; receiving, from the UE, a beam recovery request comprising an indication of the multicast beam, wherein the beam recovery request is received based at least in part on the unicast uplink grant; transmitting, to the UE in response to the beam recovery request, a response message comprising an indication of a second uplink grant, an indication of a second beam for communications between the UE and the base station, or both; and receiving, from the UE, a first uplink transmission via the second uplink grant, the second beam, or both.

Aspect 21: The method of aspect 20, further comprising: receiving, from the UE, a link recovery request comprising an indication of the multicast beam recovery procedure based at least in part on a failure of the multicast beam; and transmitting, to the UE in response to the link recovery request, an indication of the unicast uplink grant.

Aspect 22: The method of aspect 21, further comprising: transmitting, to the UE via a unicast beam, a control message indicating the unicast uplink grant comprising the set of uplink resources for the multicast beam recovery procedure.

Aspect 23: The method of any of aspects 21 through 22, further comprising: receiving, from the UE via the link recovery request, a scheduling request for transmitting the beam recovery request, wherein the indication of the unicast uplink grant is transmitted in response to the scheduling request.

Aspect 24: The method of any of aspects 20 through 23, further comprising: receiving, from the UE via the beam recovery request, an indication of one or more candidate beams for communications between the UE and the base station.

Aspect 25: The method of aspect 24, wherein the response message comprises the indication of the second uplink grant, the method further comprising: receiving, from the UE, the first uplink transmission via the second uplink grant; and receiving, from the UE, a second uplink transmission according to the one or more candidate beams based at least in part on determining an indication to receive uplink transmissions according to the one or more candidate beams.

Aspect 26: The method of aspect 25, further comprising: determining an expiration of a timer based at least in part on transmitting the response message and a timer duration, wherein determining the indication to receive uplink transmissions according to the one or more candidate beams is based at least in part on determining the expiration of the timer.

Aspect 27: The method of any of aspects 24 through 26, wherein the response message comprises the indication of the second uplink grant, the first uplink transmission is received from the UE via the second beam.

Aspect 28: The method of any of aspects 20 through 27, further comprising: receiving, from the UE via the beam recovery request, an indication of one or more beam parameters associated with the multicast beam, wherein the response message is based at least in part on the indication of the one or more beam parameters associated with the multicast beam.

Aspect 29: The method of any of aspects 20 through 28, wherein the beam recovery request is received via a MAC-CE message, a radio resource control message, or both.

Aspect 30: The method of any of aspects 20 through 29, wherein the second beam comprises a second multicast beam for communications between the UE and the base station.

Aspect 31: The method of any of aspects 20 through 30, wherein the second beam comprises a unicast beam for communications between the UE and the base station.

Aspect 32: The method of any of aspects 20 through 30, wherein the response message comprises an indication of the second beam and an indication of the multicast beam, the method further comprising: transmitting, to the UE, a retransmission of a first downlink transmission via the multicast beam based at least in part on the indication of the multicast beam; and transmitting, to the UE, a second downlink transmission via the second beam based at least in part on the indication of the second beam.

Aspect 33: The method of claim 0 wherein the one or more beam parameters comprise a reference signal received power value, a reference signal received quality value, a signal-to-noise ratio, a signal-to-interference-plus-noise ratio, or any combination thereof.

Aspect 34: An apparatus for wireless communication at a UE, comprising: a processor; memory coupled with the processor; and instructions stored in the memory and executable by the processor to cause the apparatus to perform a method of any of aspects 1 through 19.

Aspect 35: An apparatus for wireless communication at a UE, comprising at least one means for performing a method of any of aspects 1 through 19.

Aspect 36: A non-transitory computer-readable medium storing code for wireless communication at a UE, the code comprising instructions executable by a processor to perform a method of any of aspects 1 through 19.

Aspect 37: An apparatus for wireless communication at a base station, comprising a processor; memory coupled with the processor; and instructions stored in the memory and executable by the processor to cause the apparatus to perform a method of any of aspects 20 through 32.

Aspect 38: An apparatus for wireless communication at a base station, comprising at least one means for performing a method of any of aspects 20 through 32.

Aspect 39: A non-transitory computer-readable medium storing code for wireless communication at a base station, the code comprising instructions executable by a processor to perform a method of any of aspects 20 through 32.

Aspect 40: An apparatus comprising a processor; memory coupled with the processor; and instructions stored in the memory and executable by the processor to cause the apparatus to perform a method of any of aspects 33 through 33.

Aspect 41: An apparatus comprising at least one means for performing a method of any of aspects 33 through 33.

Aspect 42: A non-transitory computer-readable medium storing code the code comprising instructions executable by a processor to perform a method of any of aspects 33 through 33.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
   a processor,
   memory coupled with the processor; and
   instructions stored in the memory and executable by the processor to cause the apparatus to:
      transmit, to a network entity, a beam recovery request comprising an indication of a multicast beam, wherein the beam recovery request is transmitted based at least in part on a unicast uplink grant, wherein the unicast uplink grant comprises a set of uplink resources for a multicast beam recovery procedure based at least in part on a failure of the multicast beam associated with multicast communications between the UE and the network entity;
      receive, from the network entity in response to the beam recovery request, a response message comprising an indication of a second uplink grant, an indication of a second beam for communications between the UE and the network entity, or both; and
      transmit, to the network entity, a first uplink transmission according to the second uplink grant, over the second beam, or both.

2. The apparatus of claim 1, wherein the instructions are further executable by the processor to cause the apparatus to:
   transmit, to the network entity, a link recovery request comprising an indication of the multicast beam recovery procedure based at least in part on the failure of the multicast beam; and
   receive, from the network entity in response to the link recovery request, an indication of the unicast uplink grant.

3. The apparatus of claim 2, wherein the instructions are further executable by the processor to cause the apparatus to:
   receive, from the network entity via a unicast beam, a control message indicating the unicast uplink grant comprising the set of uplink resources for the multicast beam recovery procedure, wherein determining the unicast uplink grant is based at least in part on receiving the control message.

4. The apparatus of claim 2, wherein the instructions are further executable by the processor to cause the apparatus to:
   determine a failure of a unicast beam associated with unicast communications between the UE and the network entity; and
   determine a priority between the multicast beam recovery procedure and a unicast beam recovery procedure associated with the unicast beam based at least in part on the failure of the unicast beam, wherein transmitting the beam recovery request is based at least in part on determining the priority.

5. The apparatus of claim 4, wherein the instructions are further executable by the processor to cause the apparatus to:
determine the unicast beam recovery procedure has a higher priority than the multicast beam recovery procedure; and
perform the unicast beam recovery procedure based at least in part on determining the unicast beam recovery procedure has a higher priority than the multicast beam recovery procedure, wherein the beam recovery request is transmitted based at least in part on performing the unicast beam recovery procedure.

6. The apparatus of claim 4, wherein the instructions are further executable by the processor to cause the apparatus to:
transmit the beam recovery request via a physical random access channel based at least in part on the multicast beam recovery procedure having a higher priority than the unicast beam recovery procedure.

7. The apparatus of claim 2, wherein the instructions are further executable by the processor to cause the apparatus to:
transmit, to the network entity based on the link recovery request, a scheduling request for transmitting the beam recovery request, wherein the indication of the unicast uplink grant is received in response to the scheduling request.

8. The apparatus of claim 1, wherein the instructions are further executable by the processor to cause the apparatus to:
transmit, to the network entity via the beam recovery request, an indication of one or more candidate beams for communications between the UE and the network entity.

9. The apparatus of claim 8, wherein the response message comprises the indication of the second uplink grant, and the instructions are further executable by the processor to cause the apparatus to:
transmit, to the network entity, the first uplink transmission via the second uplink grant; and
transmit, to the network entity, a second uplink transmission according to the one or more candidate beams based at least in part on determining an indication to transmit uplink transmissions according to the one or more candidate beams.

10. The apparatus of claim 9, wherein the instructions are further executable by the processor to cause the apparatus to:
determine an expiration of a timer based at least in part on receiving the response message and a timer duration, wherein determining the indication to transmit uplink transmissions according to the one or more candidate beams is based at least in part on determining the expiration of the timer.

11. The apparatus of claim 8, wherein the response message comprises the indication of the second beam, wherein the first uplink transmission is transmitted to the network entity via the second beam.

12. The apparatus of claim 1, wherein the instructions are further executable by the processor to cause the apparatus to:
perform one or more measurements on downlink transmissions received from the network entity via the multicast beam;
determine one or more beam parameters associated with the multicast beam based at least in part on the one or more measurements; and
compare the one or more beam parameters to one or more beam parameter thresholds, the failure of the multicast beam is based at least in part on the comparing.

13. The apparatus of claim 12, wherein the instructions are further executable by the processor to cause the apparatus to:
determine, based at least in part on the comparing, that at least one beam parameter of the one or more beam parameters satisfies at least one beam parameter threshold of the one or more beam parameter thresholds.

14. The apparatus of claim 12, wherein the one or more beam parameters comprise a reference signal received power value, a reference signal received quality value, a signal-to-noise ratio, a signal-to-interference-plus-noise ratio, or any combination thereof.

15. The apparatus of claim 12, wherein the instructions are further executable by the processor to cause the apparatus to:
transmit, to the network entity via the beam recovery request, an indication of the one or more beam parameters associated with the multicast beam, wherein the response message is based at least in part on the indication of the one or more beam parameters associated with the multicast beam.

16. The apparatus of claim 1, wherein the beam recovery request is transmitted via a MAC-CE message, a radio resource control message, or both.

17. The apparatus of claim 1, wherein the second beam comprises a second multicast beam for communications between the UE and the network entity.

18. The apparatus of claim 1, wherein the second beam comprises a unicast beam for communications between the UE and the network entity.

19. The apparatus of claim 1, wherein the response message comprises an indication of the second beam and an indication of the multicast beam, and the instructions are further executable by the processor to cause the apparatus to:
receive, from the network entity, a retransmission of a first downlink transmission via the multicast beam based at least in part on the indication of the multicast beam; and
receive, from the network entity, a second downlink transmission via the second beam based at least in part on the indication of the network entity.

20. A method for wireless communication at a user equipment (UE), comprising:
transmitting, to a network entity, a beam recovery request comprising an indication of a multicast beam, wherein the beam recovery request is transmitted based at least in part on a unicast uplink grant, and wherein the unicast uplink grant comprises a set of uplink resources for a multicast beam recovery procedure based at least in part on a failure of the multicast beam associated with multicast communications between the UE and the network entity;
receiving, from the network entity in response to the beam recovery request, a response message comprising an indication of a second uplink grant, an indication of a second beam for communications between the UE and the network entity, or both; and
transmitting, to the network entity, a first uplink transmission according to the second uplink grant, over the second beam, or both.

21. The method of claim 20, further comprising:
transmitting, to the network entity, a link recovery request comprising an indication of the multicast beam recovery procedure based at least in part on the failure of the multicast beam; and
receiving, from the network entity in response to the link recovery request, an indication of the unicast uplink grant.

22. The method of claim 21, further comprising:
receiving, from the network entity via a unicast beam, a control message indicating the unicast uplink grant comprising the set of uplink resources for the multicast beam recovery procedure, wherein determining the unicast uplink grant is based at least in part on receiving the control message.

23. The method of claim 21, further comprising:
determining a failure of a unicast beam associated with unicast communications between the UE and the network entity; and
determining a priority between the multicast beam recovery procedure and a unicast beam recovery procedure associated with the unicast beam based at least in part on the failure of the unicast beam, wherein transmitting the beam recovery request is based at least in part on determining the priority.

24. The method of claim 23, further comprising:
determining the unicast beam recovery procedure has a higher priority than the multicast beam recovery procedure; and
performing the unicast beam recovery procedure based at least in part on determining the unicast beam recovery procedure has higher priority than the multicast beam recovery procedure, wherein the beam recovery request is transmitted based at least in part on performing the unicast beam recovery procedure.

25. The method of claim 23, further comprising:
transmitting the beam recovery request via a physical random access channel based at least in part the multicast beam recovery procedure having higher priority than the unicast beam recovery procedure.

26. The method of claim 21, further comprising:
transmitting, to the network entity based on the link recovery request, a scheduling request for transmitting the beam recovery request, wherein the indication of the unicast uplink grant is received in response to the scheduling request.

27. The method of claim 20, further comprising:
transmitting, to the network entity via the beam recovery request, an indication of one or more candidate beams for communications between the UE and the network entity.

28. The method of claim 27, wherein the response message comprises the indication of the second uplink grant, the method further comprising:
transmitting, to the network entity, the first uplink transmission via the second uplink grant; and
transmitting, to the network entity, a second uplink transmission according to the one or more candidate beams based at least in part on determining an indication to transmit uplink transmissions according to the one or more candidate beams.

29. An apparatus for wireless communication at a user equipment (UE), comprising:
means for transmitting, to a network entity, a beam recovery request comprising an indication of a multicast beam, wherein the beam recovery request is transmitted based at least in part on a unicast uplink grant, and wherein the unicast uplink grant comprises a set of uplink resources for a multicast beam recovery procedure based at least in part on a failure of the multicast beam associated with multicast communications between the UE and the network entity;
means for receiving, from the network entity in response to the beam recovery request, a response message comprising an indication of a second uplink grant, an indication of a second beam for communications between the UE and the network entity, or both; and
means for transmitting, to the network entity, a first uplink transmission according to the second uplink grant, over the second beam, or both.

30. A non-transitory computer-readable medium storing code for wireless communication at a user equipment (UE), the code comprising instructions executable by a processor to:
transmit, to a network entity, a beam recovery request comprising an indication of a multicast beam, wherein the beam recovery request is transmitted based at least in part on a unicast uplink grant, and wherein the unicast uplink grant comprises a set of uplink resources for a multicast beam recovery procedure based at least in part on a failure of the multicast beam associated with multicast communications between the UE and the network entity;
receive, from the network entity in response to the beam recovery request, a response message comprising an indication of a second uplink grant, an indication of a second beam for communications between the UE and the network entity, or both; and
transmit, to the network entity, a first uplink transmission according to the second uplink grant, over the second beam, or both.

* * * * *